(12) United States Patent
Sevestre et al.

(10) Patent No.: US 12,179,282 B2
(45) Date of Patent: Dec. 31, 2024

(54) WORK INTERFACE ACCESSORY, WORK KIT AND FRICTION STIR WELDING METHOD

(71) Applicant: Stirweld, Saint Gregoire (FR)

(72) Inventors: Gilles Sevestre, Nantes (FR); Simon Idot, Noyal Chatillon sur Seiche (FR)

(73) Assignee: Stirweld (FR)

( * ) Notice: Subject to any disclaimer, the term of this patent is extended or adjusted under 35 U.S.C. 154(b) by 34 days.

(21) Appl. No.: 18/106,154

(22) Filed: Feb. 6, 2023

(65) Prior Publication Data

US 2023/0249279 A1 Aug. 10, 2023

(30) Foreign Application Priority Data

Feb. 10, 2022 (FR) ..................................... 2201172

(51) Int. Cl.
*B23K 20/00* (2006.01)
*B23K 20/12* (2006.01)
*B23K 20/26* (2006.01)

(52) U.S. Cl.
CPC ...... *B23K 20/1245* (2013.01); *B23K 20/1225* (2013.01); *B23K 20/26* (2013.01)

(58) Field of Classification Search
CPC ...................... B23K 20/122–128; B23K 20/26
USPC ............................................... 228/112.1, 2.1
See application file for complete search history.

(56) References Cited

U.S. PATENT DOCUMENTS

| | | | |
|---|---|---|---|
| 2006/0032887 A1* | 2/2006 | Haynie | B23K 20/125 228/2.1 |
| 2012/0128445 A1* | 5/2012 | Hotte | B23P 17/02 29/505 |
| 2013/0068825 A1* | 3/2013 | Rosal | B23K 20/1215 228/2.1 |
| 2013/0119115 A1* | 5/2013 | Kato | B23K 20/126 228/2.1 |
| 2014/0140779 A1 | 5/2014 | Becker et al. | |
| 2014/0215797 A1* | 8/2014 | Hotte | B23K 20/127 29/432 |
| 2014/0219740 A1* | 8/2014 | Hotte | F16B 11/00 411/171 |
| 2016/0221116 A1* | 8/2016 | Kato | B23K 20/126 |
| 2023/0249279 A1* | 8/2023 | Sevestre | B23K 20/122 228/112.1 |

FOREIGN PATENT DOCUMENTS

| | | | | |
|---|---|---|---|---|
| CN | 102744514 A | * | 10/2012 | ......... B23K 20/126 |
| CN | 104070288 A | * | 10/2014 | ......... B23K 20/125 |
| CN | 204470674 U | | 7/2015 | |
| CN | 105728935 A | * | 7/2016 | ......... B23K 20/125 |
| CN | 105750725 A | | 7/2016 | |
| CN | 106077946 A | * | 11/2016 | ......... B23K 20/125 |

(Continued)

*Primary Examiner* — Kiley S Stoner
(74) *Attorney, Agent, or Firm* — Lerner David LLP

(57) ABSTRACT

The invention relates to a work interface accessory, comprising an external body having a wall delimiting a recess for the introduction of a rotating portion of the friction stir welding head, an upper plate comprising fastening portions against the head, a central rotating shaft projecting to carry a work tool, the shaft comprising an internally toothed coupling sleeve to allow the shaft to be driven in rotation, when an externally toothed ring gear of the rotating portion of the head rotates in the sleeve.

18 Claims, 16 Drawing Sheets

(56) References Cited

FOREIGN PATENT DOCUMENTS

| | | | | |
|---|---|---|---|---|
| CN | 106825908 A | * | 6/2017 | ......... B23K 20/1255 |
| CN | 107052560 A | * | 8/2017 | ........... B23K 20/125 |
| CN | 107442927 A | * | 12/2017 | ......... B23K 20/1245 |
| CN | 108817641 A | * | 11/2018 | ......... B23K 20/1245 |
| CN | 108857044 A | * | 11/2018 | ............ B23K 20/12 |
| CN | 109093245 A | * | 12/2018 | ........... B23K 20/122 |
| CN | 109551096 A | * | 4/2019 | |
| CN | 110102868 A | * | 8/2019 | ........... B23K 20/122 |
| CN | 111922504 A | * | 11/2020 | |
| CN | 113134676 A | * | 7/2021 | ......... B23K 20/1245 |
| CN | 111545895 B | * | 8/2021 | ........... B23K 20/122 |
| CN | 113351984 A | * | 9/2021 | |
| CN | 111545891 B | * | 11/2021 | ......... B23K 20/1255 |
| CN | 113953649 A | * | 1/2022 | |
| CN | 113977068 A | * | 1/2022 | |
| CN | 115255602 A | * | 11/2022 | |
| DE | 202008001344 U1 | * | 5/2008 | ........... B23K 20/125 |
| DE | 102016113289 A1 | * | 1/2018 | ........... B23K 20/122 |
| DE | 102016219802 A1 | * | 4/2018 | |
| EP | 3389913 B1 | | 4/2020 | |
| JP | 2000015457 A | * | 1/2000 | ........... B23K 20/121 |
| JP | 2001314982 A | * | 11/2001 | ......... B23K 20/1265 |
| JP | 2006110589 A | * | 4/2006 | ............. B23K 11/11 |
| JP | 2007054837 A | * | 3/2007 | ........... B23K 20/125 |
| JP | 2009190037 A | * | 8/2009 | ......... B23K 20/1245 |
| JP | 6099291 B1 | * | 3/2017 | ........... B23K 20/122 |
| JP | 2017512656 A | * | 5/2017 | |
| KR | 20120055035 A | * | 5/2012 | |
| KR | 101833294 B1 | * | 3/2018 | |
| WO | WO-2011043127 A1 | * | 4/2011 | ......... B23K 20/1265 |
| WO | WO-2012068663 A1 | * | 5/2012 | ............. B21J 15/027 |
| WO | WO-2014009753 A1 | * | 1/2014 | ............. B21J 15/027 |
| WO | WO-2017102953 A1 | * | 6/2017 | ........... B23K 20/125 |
| WO | WO-2017194793 A1 | * | 11/2017 | ......... B23K 20/1245 |
| WO | WO-2022122446 A1 | * | 6/2022 | ........... B23K 20/122 |

\* cited by examiner

[Fig. 1]
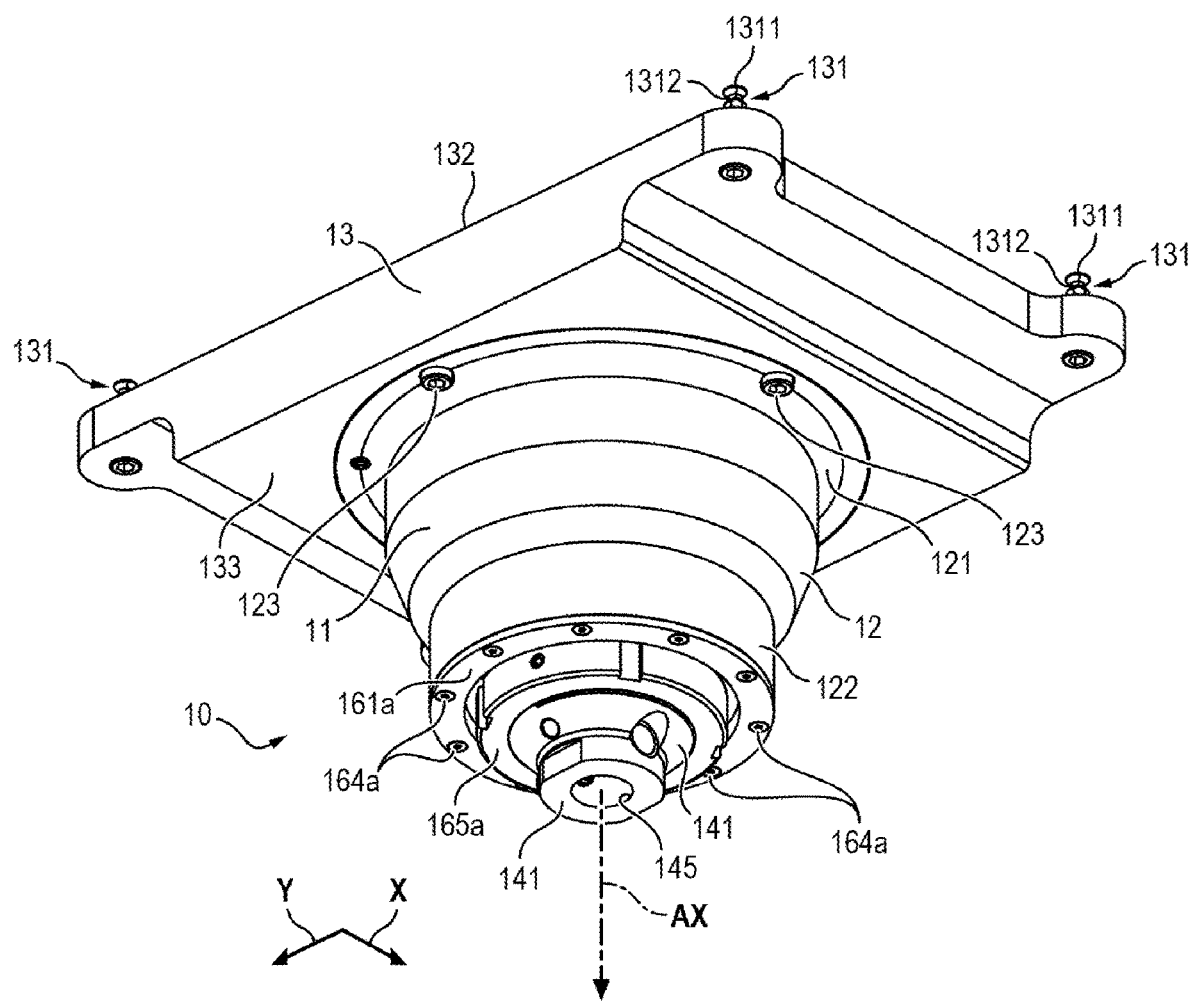

[Fig. 2]
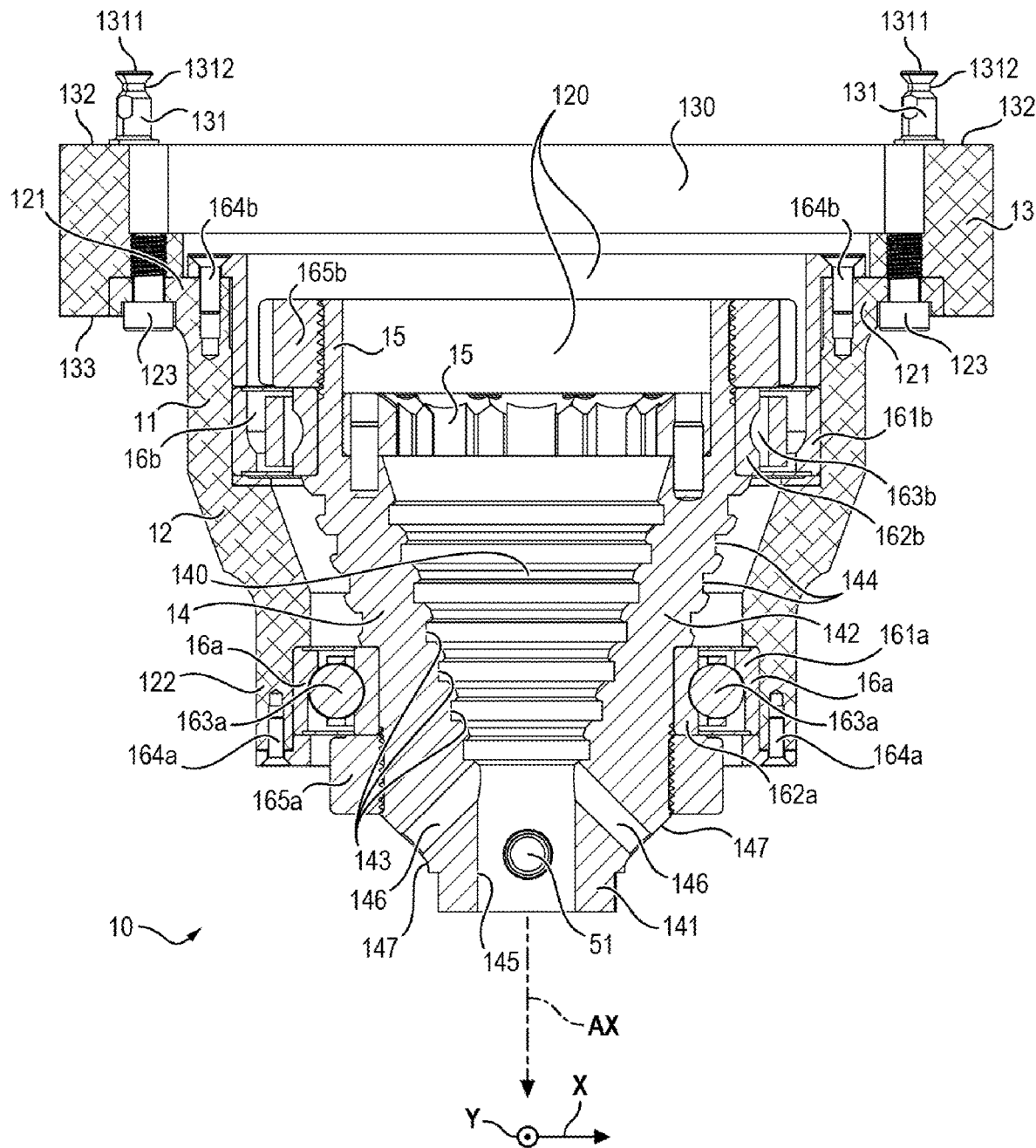

[Fig. 3]
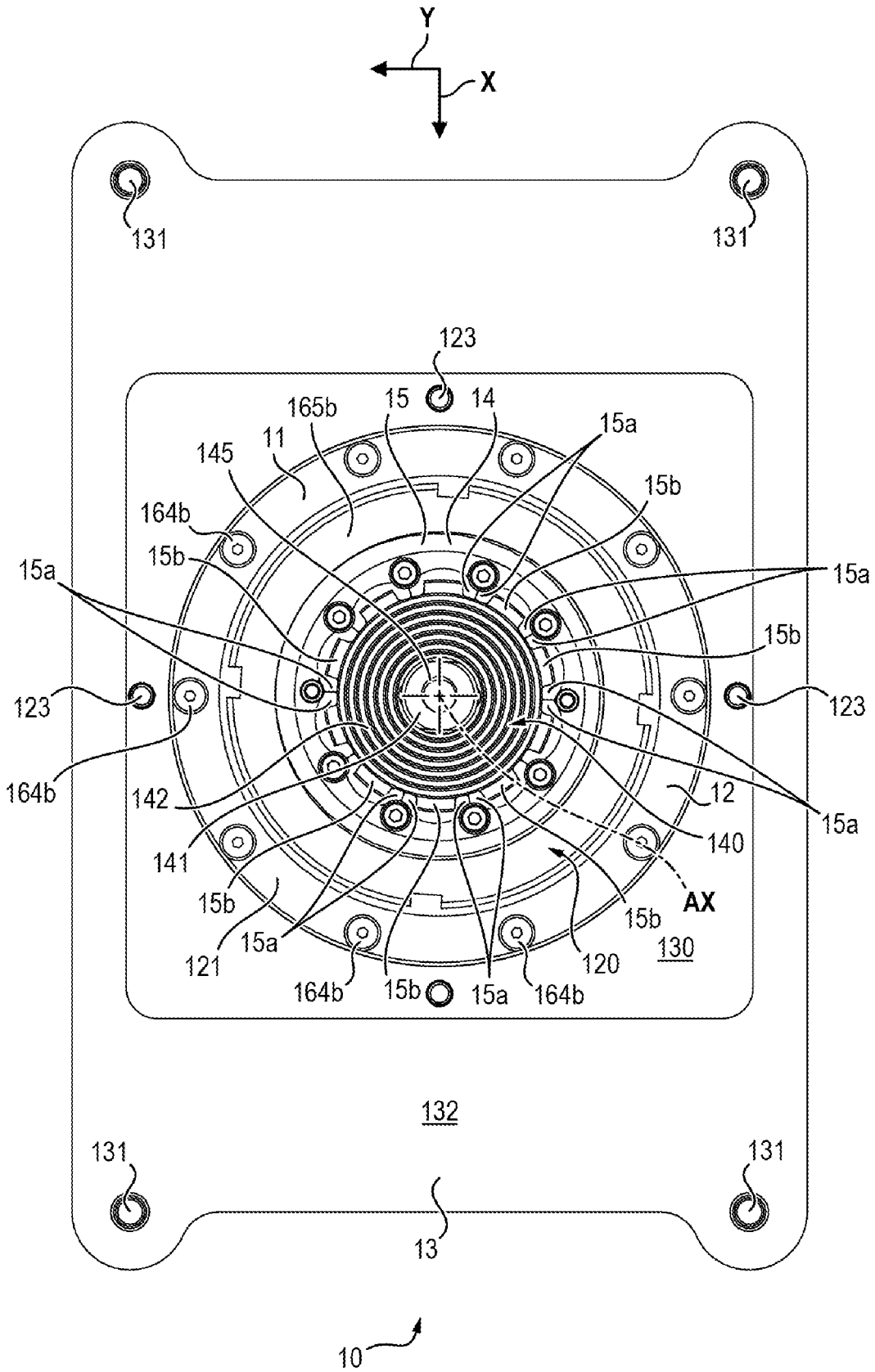

[Fig. 4]
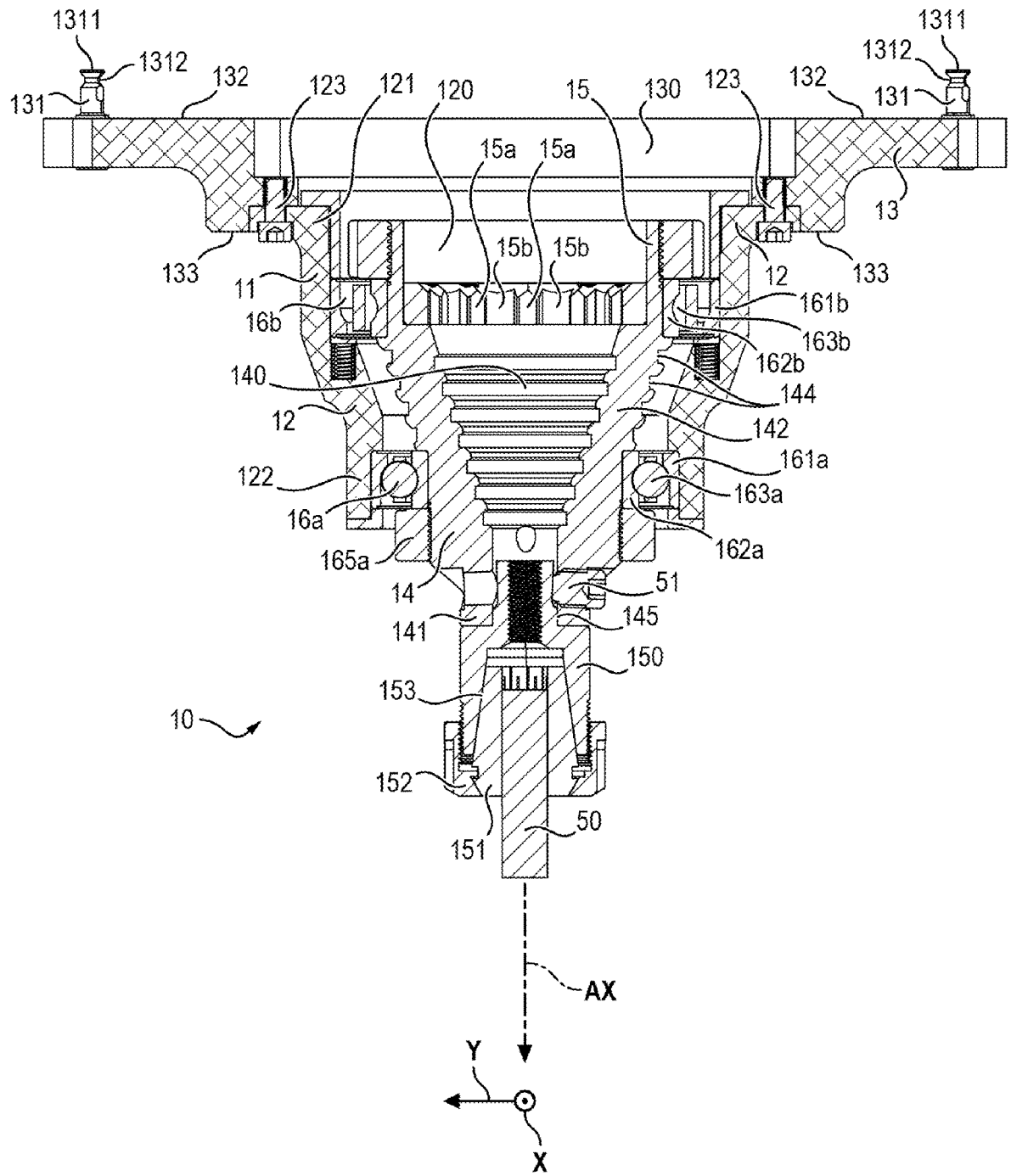

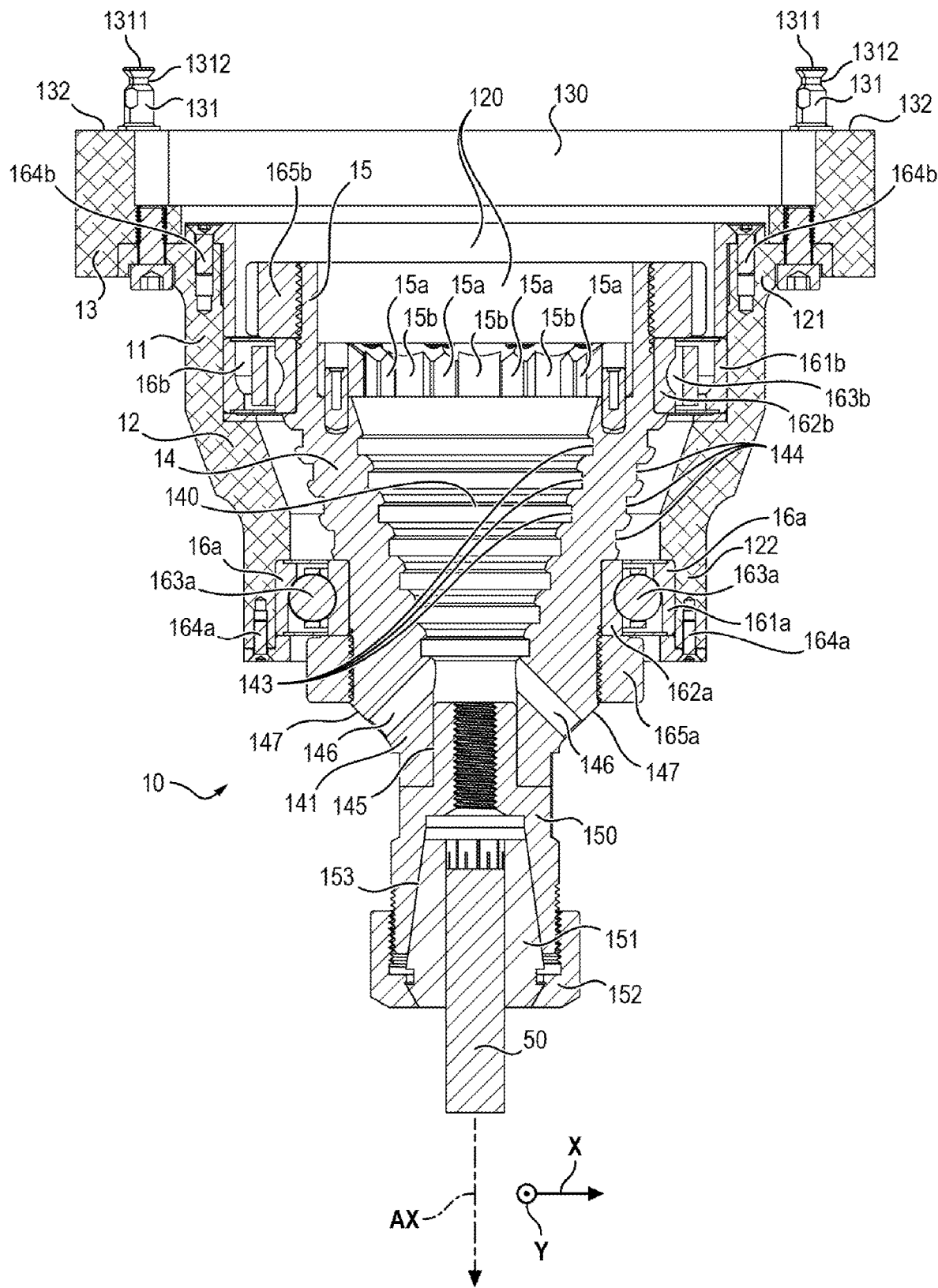
[Fig. 5]

[Fig. 6]
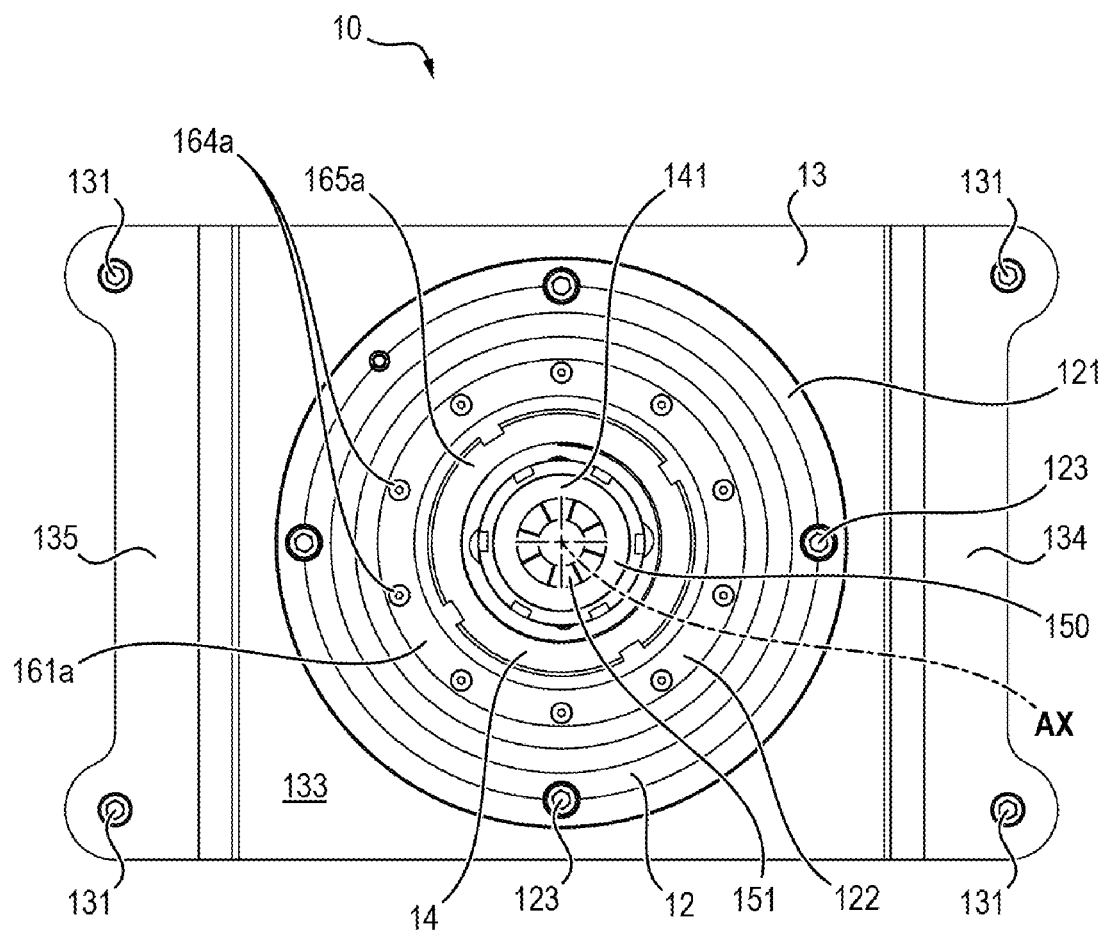

[Fig. 7]
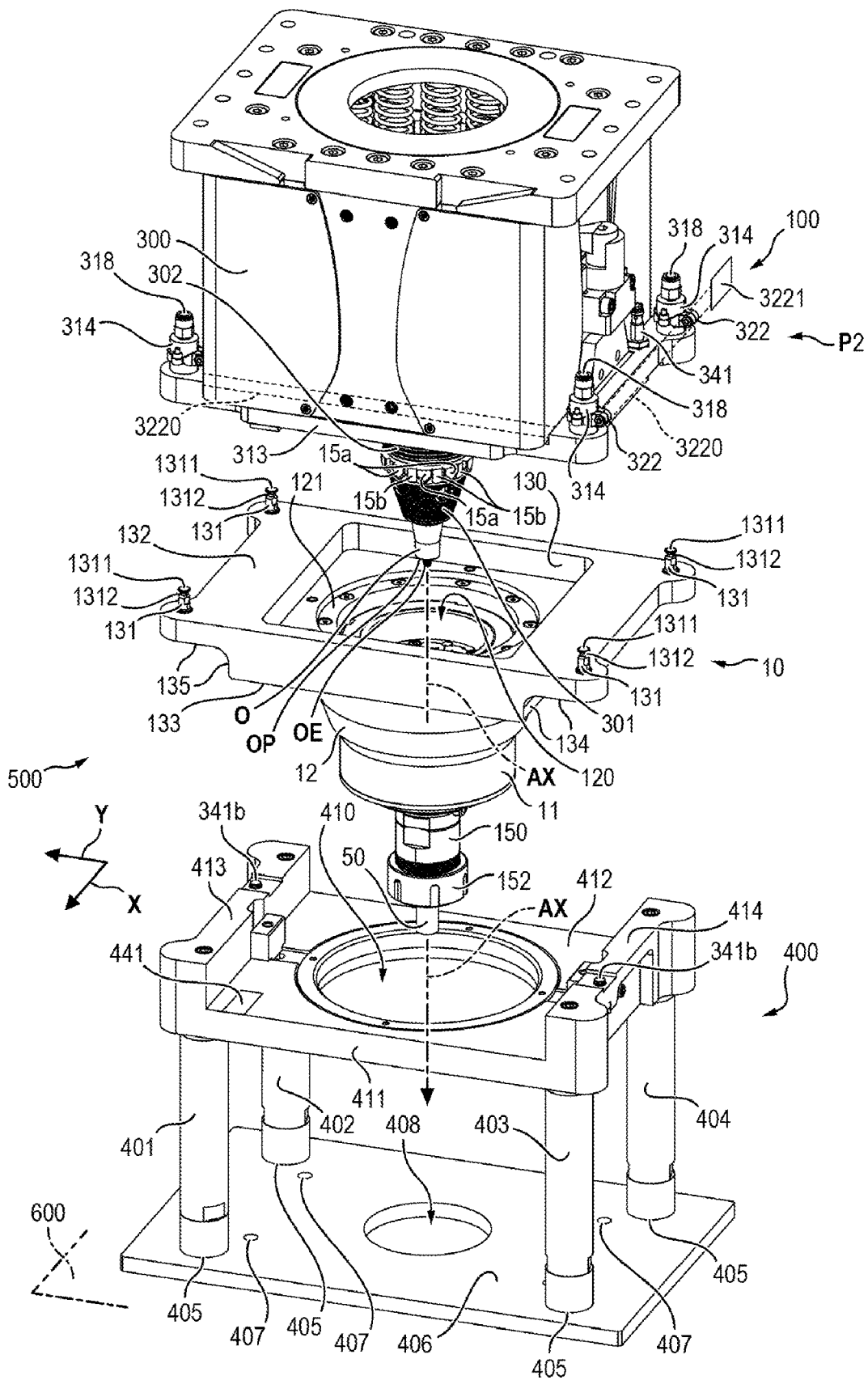

[Fig. 8A]
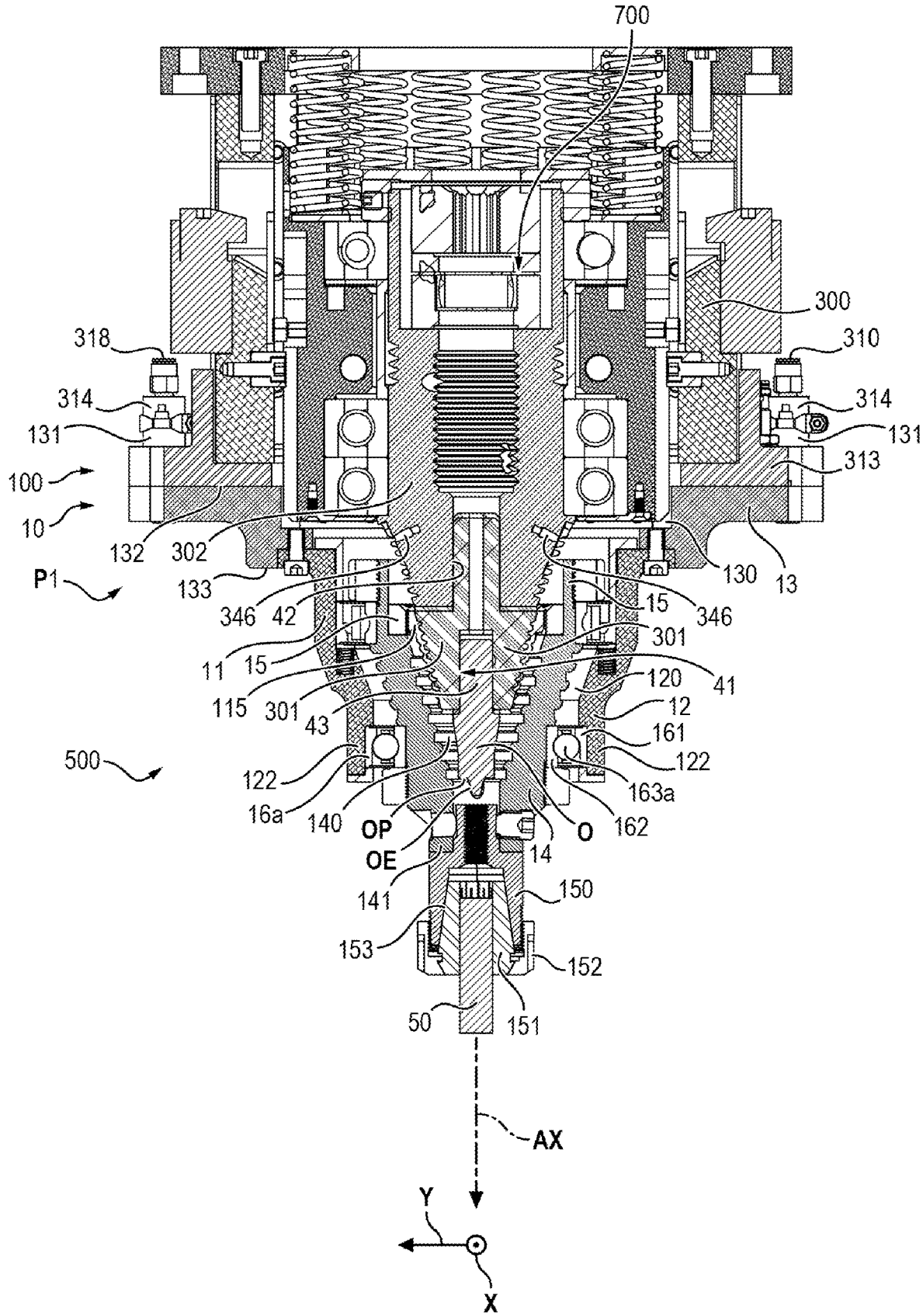

[Fig. 8B]
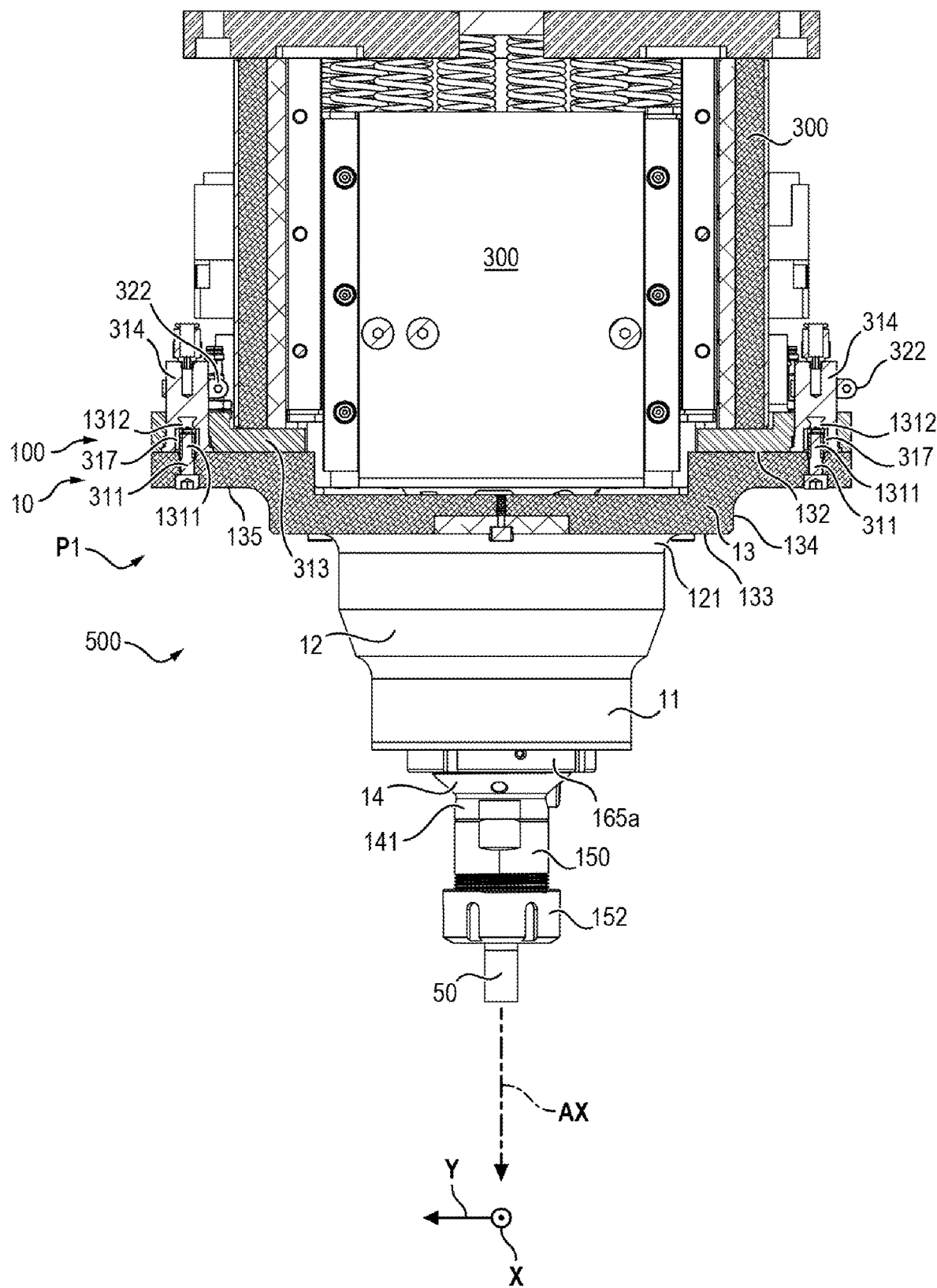

[Fig. 9]
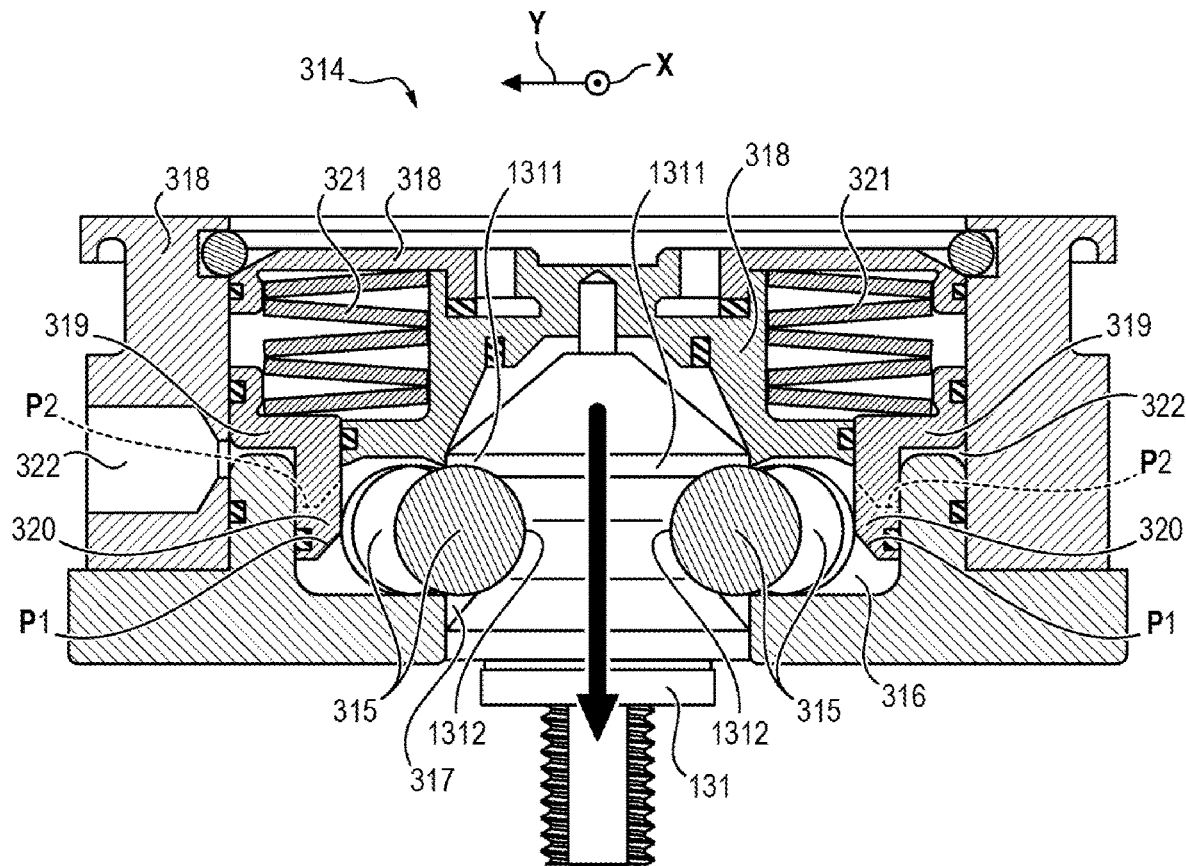
[Fig. 10]
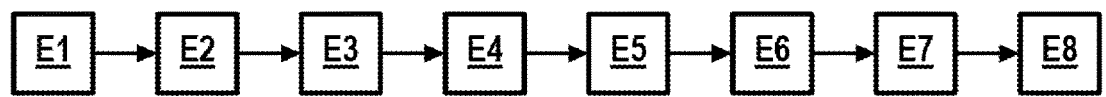

[Fig. 11]
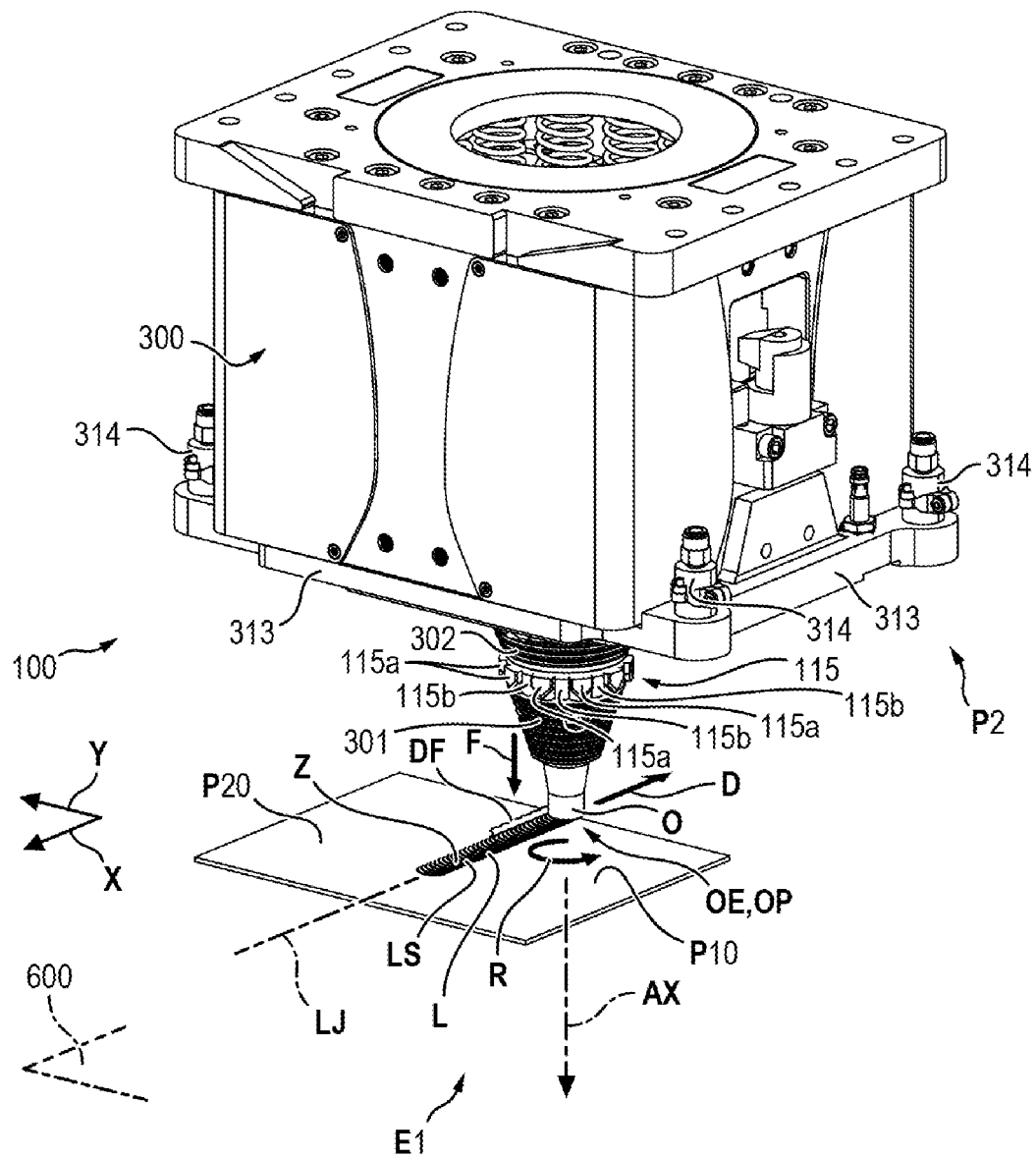

[Fig. 12]
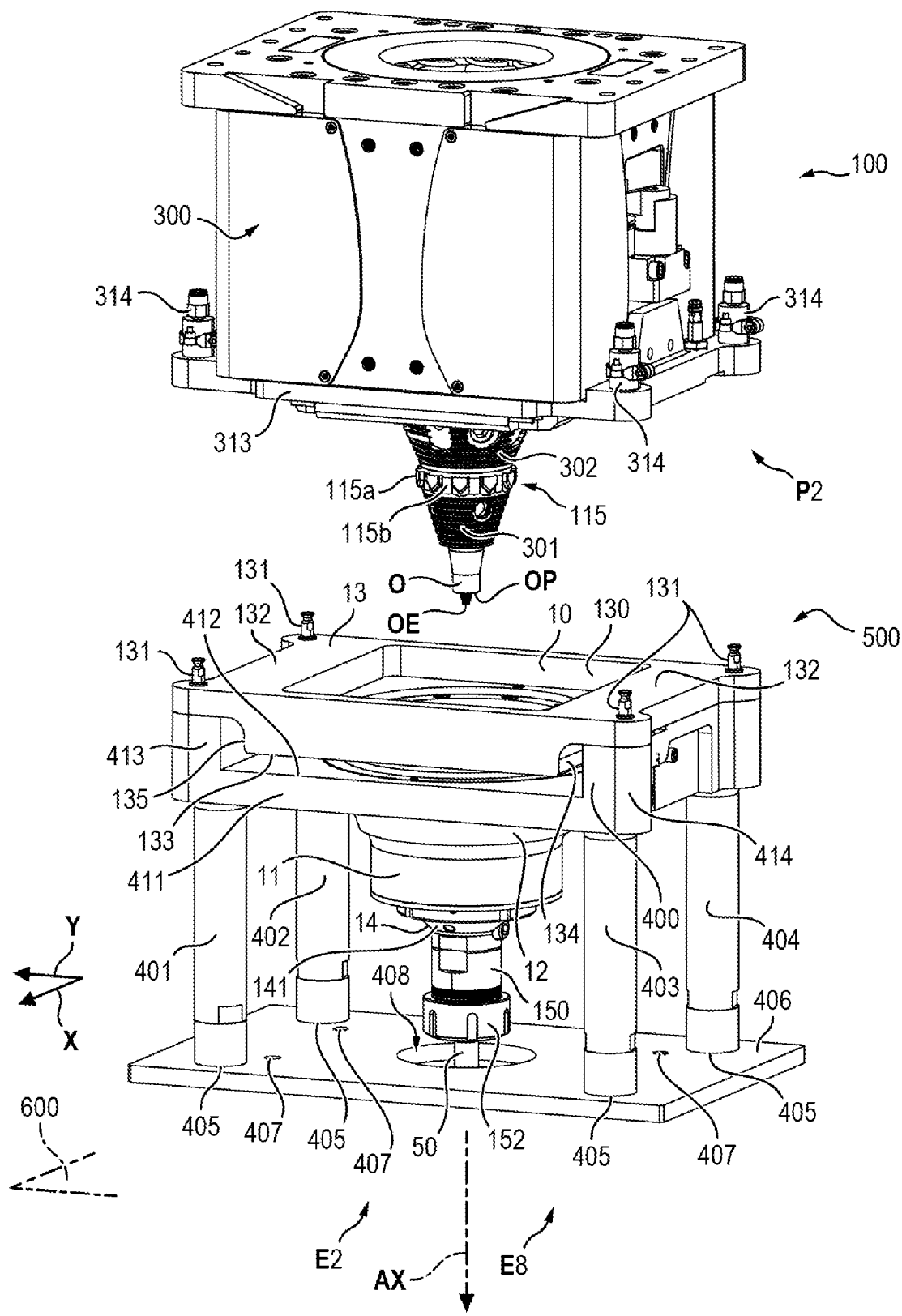

[Fig. 13]
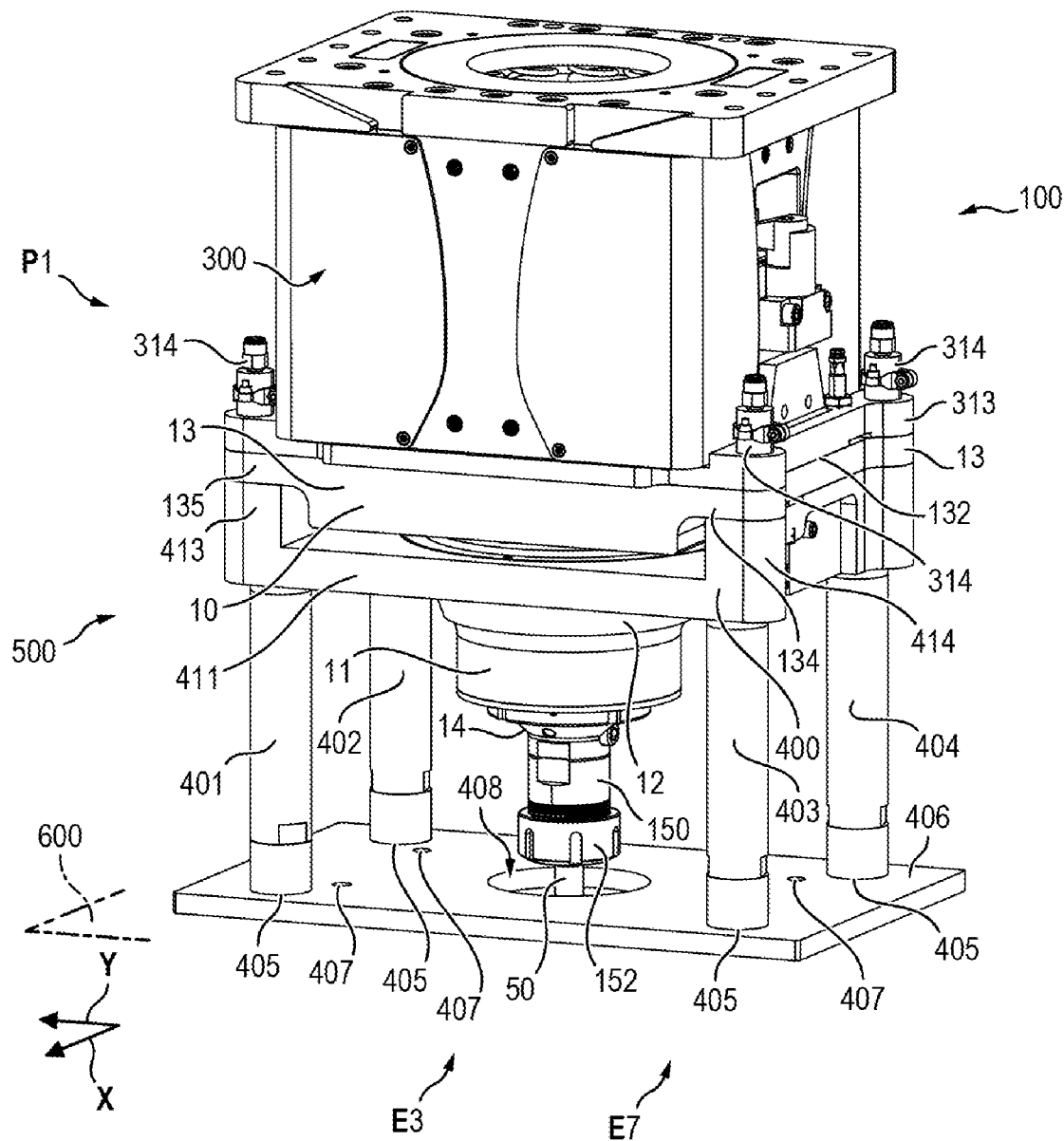

[Fig. 14]
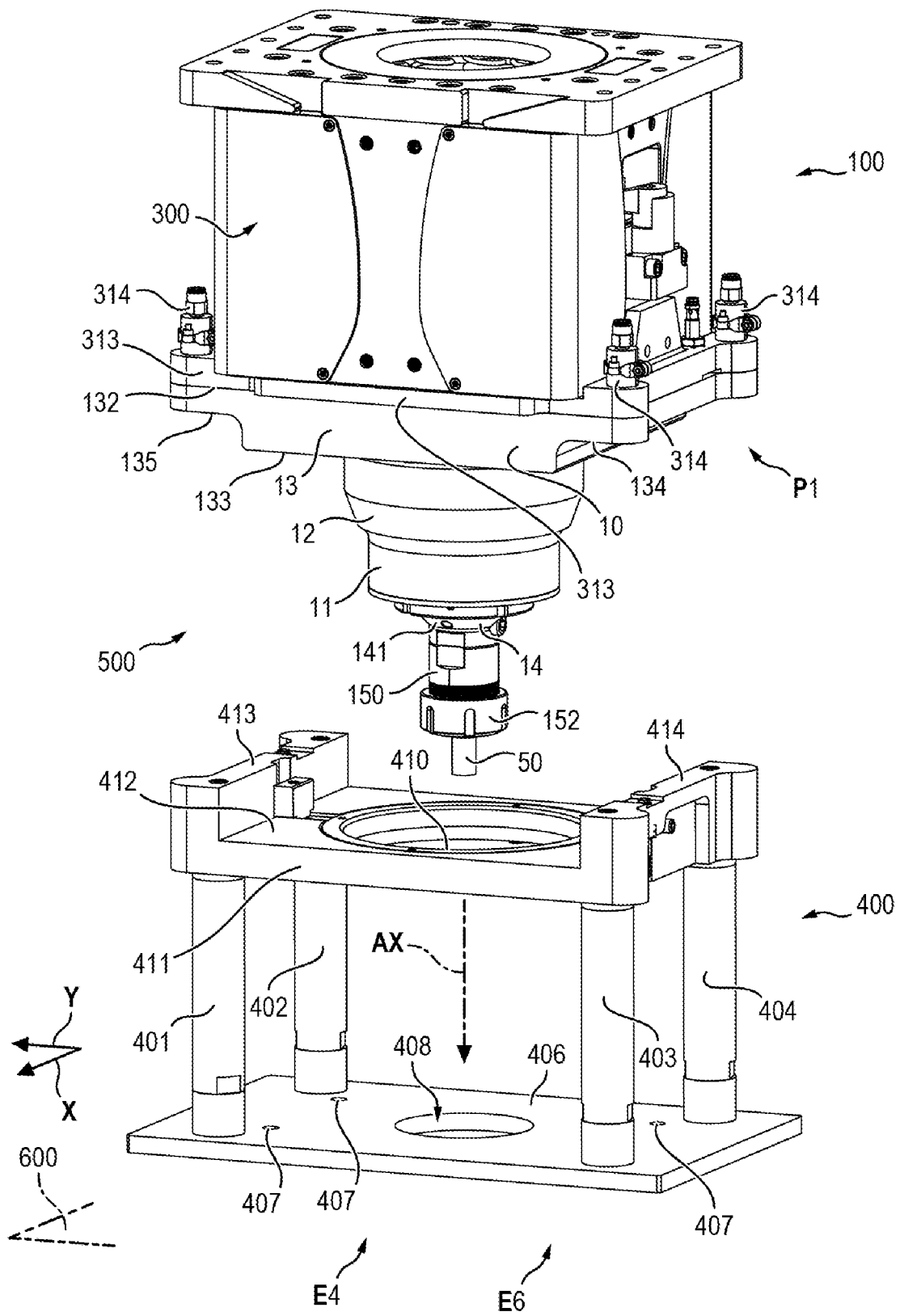

[Fig. 15]
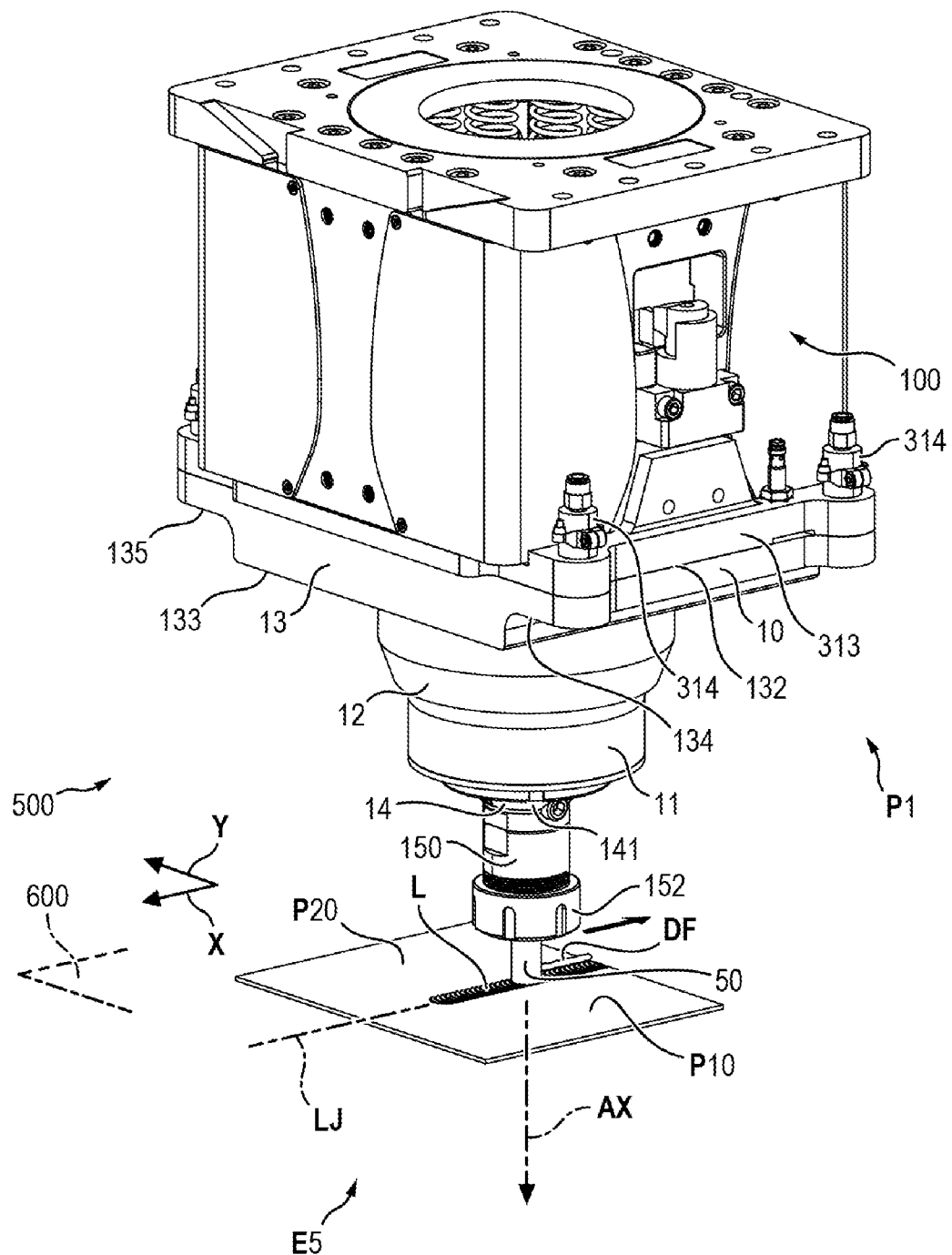

[Fig. 16]
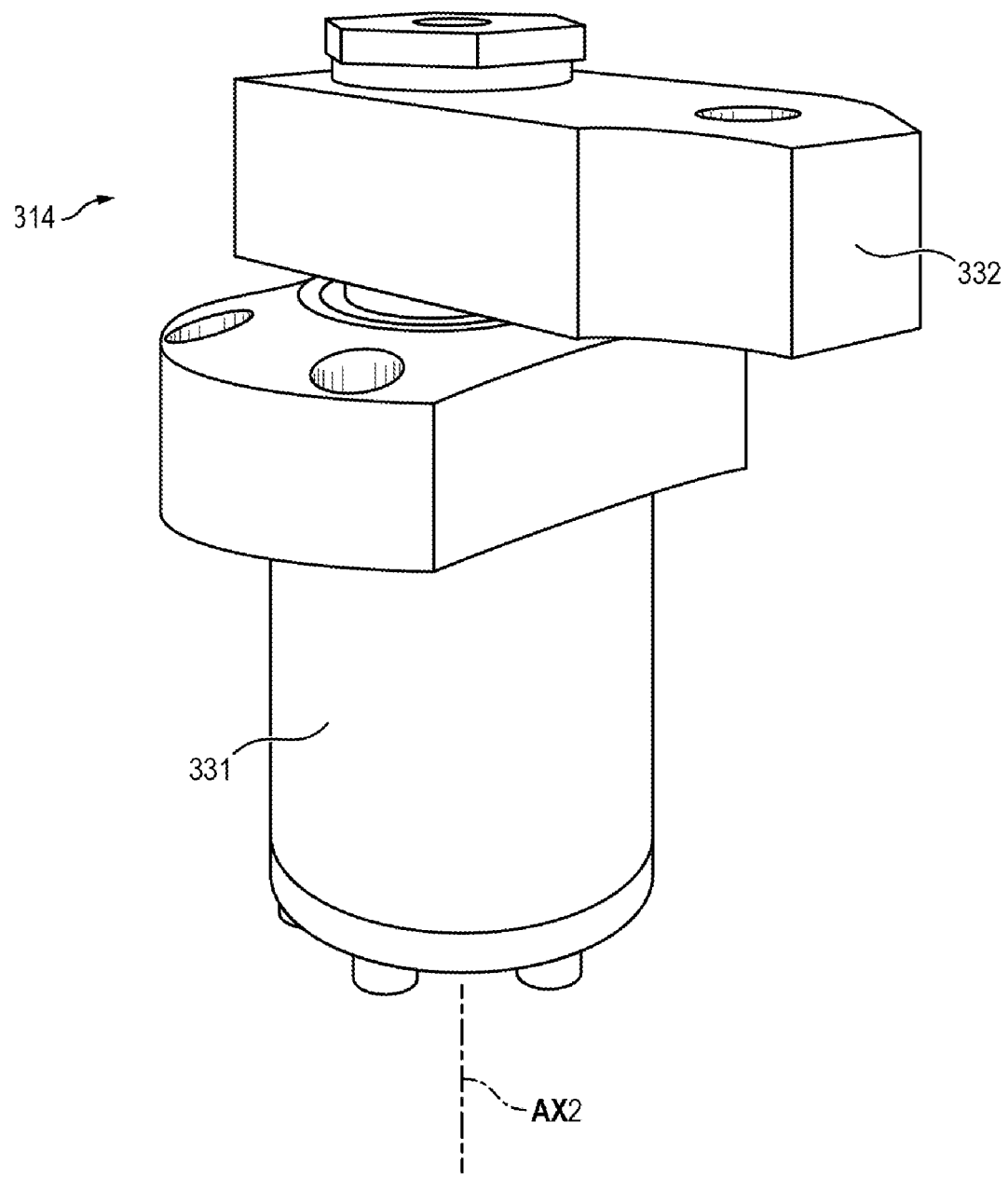

WORK INTERFACE ACCESSORY, WORK KIT AND FRICTION STIR WELDING METHOD

CROSS-REFERENCE TO RELATED APPLICATIONS

This application claims priority from French application number 2201172, filed Feb. 10, 2022, the disclosure of which is hereby incorporated herein by reference.

The invention relates to a work interface accessory, intended to be assembled on a friction stir welding head, as well as a kit comprising this accessory.

The friction stir welding heads allow performing butt welds of two parts. To do so, a protruding rotating pin bordered by a shoulder is rotated by the head and is moved along the joint between the two edges of the parts, to make a welding line along this joint by friction stir of the material of the parts.

Document EP-B-3 389 913 describes an example of a friction stir welding head.

One of the problems with these welding heads is that the weld performed by the displacement of the head and the rotation of the pin generates residual protruding burrs and asperities along the welding line. The other problem is that it is not possible to add a work tool in an automated manner.

An additional work may therefore be necessary to eliminate these asperities and burrs, or may be necessary for other operations, such as material removal operations.

One goal of the invention is to obtain a work interface accessory, which allows eliminating these asperities and burrs by using the friction stir welding head or which allows any other material removal operation.

To this end, a first subject matter of the invention is a work interface accessory, which is intended to be assembled on a friction stir welding head and which is able to be disassembled relative to the friction stir welding head, wherein the work interface accessory comprises an external body having a first side wall delimiting a first recess open on top for introduction of a rotating portion of the friction stir welding head in the first recess and for withdrawal of the friction stir welding head out of the first recess, the work interface accessory comprises an upper plate, which is fastened on an upper portion of the first side wall or which is integral with the upper portion of the first side wall, which has a first upper opening connected to the first recess and which comprises fastening portions, allowing removable fastening against the friction stir welding head, the work interface accessory comprising a central shaft, which is rotatably assembled in the first side wall around an axis of rotation, the central shaft having a second lower portion, which projects from a first lower portion of the first side wall downwards and which is intended to carry a work tool, the central shaft comprising in the first recess an internally toothed coupling sleeve to allow the central shaft to be driven in rotation, when an externally toothed ring gear of the rotating portion of the friction stir welding head is introduced into the internally toothed coupling sleeve and rotates in the internally toothed coupling sleeve around the axis of rotation.

Thanks to the invention, the interface accessory allows driving in rotation a work tool making it possible to eliminate the residual protruding burrs and asperities appearing along the welding line following the friction stir welding operation performed by the pin of the head alone or other material removal operations. The interface accessory allows driving in rotation the work tool from the rotation of the rotating portion of the head, rotating its pin. The interface accessory thus allows trimming the welding line by the work tool from the head. This trimming operation of the welding line can be carried out quickly after making the friction stir welding line by the head.

According to one embodiment of the invention, each fastening portion comprises a gripping mechanism comprising a system of clamps, which is fastened to the upper plate.

According to one embodiment of the invention, each fastening portion comprises a pull tab to be gripped which is fastened to the upper plate.

According to one embodiment of the invention, at least one bearing for supporting the rotation of the central shaft around the vertical axis of rotation is disposed between the central shaft and the first side wall.

According to one embodiment of the invention, the at least one bearing for supporting rotation of the central shaft is a bearing assembly, comprising at least a first bearing guide fastened to the first side wall, at least a second bearing guide, which is fastened to the central shaft and which is rotatable relative to the first bearing guide.

According to one embodiment of the invention, the central shaft comprises a second side wall delimiting a second recess open on top for introduction of the rotating portion of the friction stir welding head, the second recess being comprised in the first recess, the internally toothed coupling sleeve being fastened to the second side wall or being integral with the second side wall and extending the second recess.

According to one embodiment of the invention, the second side wall has a horizontal width decreasing between the internally toothed coupling sleeve and the second lower portion of the central shaft.

According to one embodiment of the invention, the second side wall comprises internal grooves and/or external grooves.

According to one embodiment of the invention, the internal grooves and/or the external grooves are transverse to the axis of rotation.

According to one embodiment of the invention, the second lower portion of the central shaft comprises a central lower recess, in which the work tool or a support of the work tool is intended to be fastened.

According to one embodiment of the invention, the second lower portion of the central shaft comprises, in addition to the central lower recess, at least one through channel between the second housing and an external surface of the second lower portion.

A second subject matter of the invention is a work kit, comprising the work interface accessory as described above,
wherein the work kit further comprises a cradle, separate from the work interface accessory,
the cradle comprising an upper support and support elements fastened under the upper support to maintain the upper support at a determined height above a lower end of the support elements,
the upper support being able to hold the upper plate of the work interface accessory,
the upper support comprising a second opening facing upwards for the external body of the work interface accessory to pass through the second opening between the support elements, when the work interface accessory is disposed in a storage position on the upper support.

According to one embodiment of the invention, the cradle comprises a lower assembly panel, fastened to the lower end of the support elements.

According to one embodiment of the invention, the work kit further comprises the friction stir welding head, which comprises a frame and the rotating portion, rotatably assembled relative to the frame and protruding therefrom downwards,
- the frame comprising a second plate for bearing against the upper plate,
- the second plate comprising a gripping mechanism comprising a system of clamps, which is facing downwards and which is intended to be fastened on the fastening portions of the upper plate of the work interface accessory, or the fastening portions of the upper plate of the work interface accessory comprising a gripping mechanism comprising a system of clamps, which is facing upwards and which is intended to be fastened on other fastening portions of the second plate of the friction stir welding head.

According to one embodiment of the invention, the fastening portions of the upper plate of the work interface accessory each comprise a pull tab, which is facing upwards and which is fastened to the upper plate, or the other fastening portions of the second plate of the friction stir welding head each comprise a pull tab, which is facing downwards and which is fastened to the second plate.

According to one embodiment of the invention, the clamps are actuatable by a pressurized fluid or electrically or mechanically or hydraulically or magnetically to be either in a position of gripping the fastening portions, or in a position of releasing the fastening portions.

According to one embodiment of the invention, the clamps are arranged so that the supply of the pressurized fluid causes a transition from the position of gripping of the fastening portions to the position of releasing of the fastening portions and so that the absence of supply of the pressurized fluid allows a transition from the position of releasing of the fastening portions to the position of gripping of the fastening portions.

According to one embodiment of the invention, the operable gripping clamps each comprise an inlet for supplying the pressurized fluid, the inlets for supplying the pressurized fluid being connected to a shared pipe for supplying the pressurized fluid.

According to one embodiment of the invention, each fastening portion comprises a pull tab, which is facing upwards, which is fastened to the plate and which has a lateral gripping recess,
- each operable gripping clamp comprises a casing, second balls movable in a duct of the casing, the duct communicating with a hole for introducing the pull tab in the casing,
- each operable gripping clamp comprises a piston slidably assembled in the casing and a spring compressed between the casing and the piston,
- the piston comprising an external lug located in the duct, the external lug being configured to push the second balls into the hole under the force exerted by the spring so that the second balls projecting in the hole are against the lateral gripping recess of the pull tab in the position of gripping of the fastening portion introduced into the hole,
- each operable gripping clamp comprises an inlet for supplying pressurized fluid against the piston oppositely to the spring,
- the supply of the pressurized fluid into the inlet making it possible to displace the piston oppositely to the spring in order to move the external lug away from the second balls, to allow the second balls to move away from the hole in the position of releasing of the fastening portion.

According to one embodiment of the invention, the second plate of the friction stir welding head comprises a second sensor for detecting a presence of the upper plate of the work interface accessory.

According to one embodiment of the invention, the upper support comprises a first sensor for detecting the presence of the upper plate of the work interface accessory.

According to one embodiment of the invention, the work kit further comprises as a work tool a machining tool or a milling tool.

A third subject matter of the invention is a method for welding parts using the work kit as described above, comprising
- during a first step, welding the parts fastened on a table according to a welding trajectory using the friction stir welding head, one pin of which fastened to the rotating portion is rotated around the axis of rotation against the parts, moving the friction stir welding head and the table relative to each other according to the welding trajectory, to make a welding line,
- during a second step subsequent to the first step, moving the friction stir welding head and the table relative to each other to bring the friction stir welding head above the first recess of the work interface accessory, having been disposed on the upper support of the cradle having been fastened on the table, a work tool or support of the work tool having been fastened under the second lower portion of the central shaft of the work interface accessory,
- during a third step subsequent to the second step, moving the friction stir welding head and the table relative to each other to introduce the friction stir welding head into a second recess of the central shaft of the work interface accessory, so as to mesh the externally toothed ring gear of the rotating portion of the friction stir welding head with the internally toothed coupling sleeve of the central shaft of the work interface accessory, and actuating the clamps of the friction stir welding head to grip the fastening portions of the work interface accessory,
- during a fourth step subsequent to the third step, moving the friction stir welding head and the table relative to each other to lift with the friction stir welding head the work interface accessory above the cradle,
- during a fifth step subsequent to the fourth step, moving the friction stir welding head and the table relative to each other to bring the work tool against the welding line of the parts by rotating around the axis of rotation the rotating portion of the friction stir welding head, moving the friction stir welding head and the table relative to each other according to the welding trajectory.

According to one embodiment of the invention, during a sixth step subsequent to the fifth step, moving the friction stir welding head and the table relative to each other to move the work tool away from the welding line of the parts and bring the work interface accessory above the cradle, stopping the rotation of the rotating portion of the friction stir welding head,
- during a seventh step subsequent to the sixth step, moving the friction stir welding head and the table relative to each other to dispose the work interface accessory on the upper support of the cradle, during an eighth step subsequent to the seventh step, actuating the clamps of the friction stir welding head to release the fastening portions of the work interface accessory, then moving the friction stir welding head and the table relative to each other to withdraw the friction stir welding head out of the work interface accessory.

The invention will be better understood upon reading the following description, given solely by way of non-limiting example with reference to the figures below of the appended drawings.

FIG. 1 represents a schematic perspective bottom view of a work interface accessory according to one embodiment of the invention.

FIG. 2 represents a schematic vertical sectional view of a work interface accessory according to one embodiment of the invention.

FIG. 3 represents a schematic top view of a work interface accessory according to one embodiment of the invention.

FIG. 4 represents a schematic vertical sectional view of a work interface accessory according to one embodiment of the invention.

FIG. 5 represents a schematic vertical sectional view of a work interface accessory according to one embodiment of the invention.

FIG. 6 represents a schematic bottom view of a work interface accessory according to one embodiment of the invention.

FIG. 7 represents a schematic exploded perspective view of a work kit according to one embodiment of the invention.

FIG. 8A represents a schematic vertical sectional view of a work interface accessory fastened to a welding head according to one embodiment of the invention.

FIG. 8B represents a schematic side view of a work interface accessory fastened to a welding head according to one embodiment of the invention.

FIG. 9 represents a schematic vertical sectional view of an actuatable clamp for gripping the work interface accessory according to one embodiment of the invention.

FIG. 10 represents a flowchart of a welding method using the work kit according to one embodiment of the invention.

FIG. 11 represents a first step of the welding method according to one embodiment of the invention.

FIG. 12 represents a second step of the welding method according to one embodiment of the invention.

FIG. 13 represents a third step of the welding method according to one embodiment of the invention.

FIG. 14 represents a fourth step of the welding method according to one embodiment of the invention.

FIG. 15 represents a fifth step of the welding method according to one embodiment of the invention.

FIG. 16 represents a schematic side view of an actuatable clamp for gripping the work interface accessory according to another embodiment of the invention.

WORK INTERFACE ACCESSORY 10

One example of a work interface accessory 10 is first described below with reference to FIGS. 1 to 7, 8A and 8B.

The work interface accessory 10 is intended to be assembled on a friction stir welding head 100, one example of which will be described below with reference to FIGS. 7, 8A, 8B and 11 to 15. The work interface accessory 10 is able to be assembled on the friction stir welding head 100 and is able to be disassembled from the friction stir welding head 100. The work interface accessory 10 is distinct from the friction stir welding head 100. The work interface accessory 10 can be separated from the friction stir welding head 100 and fastened to the friction stir welding head 100.

In the figures, the axis AX is considered to be vertical, by being oriented downwards. The directions going from inside to outside are the radial (or transverse) directions starting from the axis AX and are therefore horizontal. The horizontal direction X is perpendicular to the other horizontal direction Y. Of course, the axis AX could be oriented other than vertically, for example horizontally or other.

The accessory 10 comprises an external body 11 formed mainly by a first side wall 12 extending from top to bottom around the axis AX. The first side wall 12 has an upper portion 121 (or introduction edge 121) delimiting a first recess 120 open on the top, allowing the introduction of the rotating portion (301, 302 or driving mandrel 301, 302) of the friction stir welding head 100 in the first recess 120 and the withdrawal of the friction stir welding head 100 out of the first recess 120.

The accessory 10 comprises an upper plate 13, which is fastened around the upper portion 121, for example by bolting or screwing 123 or the like. Of course, the upper plate 13 could be integral with the upper portion 121 of the first side wall 12. A first upper opening 130 of the upper plate 13 opens out into the first recess 120 and into the external body 11. The plate 13 comprises fastening portions 131 (or removable fasteners 131) used for the removable fastening of the upper plate 13 against the welding head 100. The fastening portions 131 protrude from the upper surface 132 of the plate 13 upwards, in the example represented in FIGS. 1 to 7, 8A, 8B.

The accessory 10 comprises a central shaft 14 rotatably assembled in the first recess 120 in the external body 11. The central shaft 14 is able to rotate around the axis of rotation AX relative to the first side wall 12 of the external body 11 and to the plate 13. The central shaft 14 projects downwards along the axis AX by its second lower portion 141 (or second lower edge 141) out of the first lower portion 122 (or first lower edge 122) of the first side wall 12. This second lower portion 141 of the central shaft 14, protruding downwards, is used to carry a work tool 50 or a support 150 of a work tool 50. The work tool 50 or the support 150 of a work tool 50 can be removably fastened to the second lower portion 141 protruding from the central shaft 14. The work tool 50 can be fastened through a clamping mandrel 151 positioned in the lower opening 153 of the support 150, the clamping mandrel 151 being surrounded by a clamping ring 152 screwed around the support 150, the tool 50 protruding out of the clamping mandrel 151, of the clamping ring 152 and of the support 150 downwards.

The central shaft 14 comprises a second side wall 142 delimiting a second recess 140 open on the top. This second recess 140 is configured to receive the rotating portion 301, 302 of the welding head 100. This second recess is therefore located in the first recess 120 in the first side wall 12 of the external body 11. The first upper opening 130, the first recess 120 and the second recess 140 are connected to each other and are located around the axis AX.

In the central shaft 14, there is an internally toothed coupling sleeve 15, centered on the axis AX and extending the second recess 140. This internally toothed coupling sleeve 15 forms part of the central shaft 14 and is integral in rotation with the central shaft 14 and to the second side wall 142 about the axis AX. The internally toothed coupling sleeve 15 is fastened to the second side wall 142 or is integral with the second side wall 142.

The internally toothed coupling sleeve 15 is configured to mesh with an externally toothed ring gear 115 of the rotating portion (301, 302) of the welding head 100, when this ring gear 115 is introduced into the sleeve 15.

The internally toothed coupling sleeve 15 comprises first internal teeth 15a (or clutches 15a) facing inwardly of the sleeve 15 and distributed around the axis AX, as well as first internal notches 15b, which are located between the first internal teeth 15a and which are also facing inwardly of the sleeve 15 and distributed around the axis AX, as represented in FIGS. 2, 3, 4 and 5. The ring gear 115 comprises second external teeth 115a (or clutches 115a) facing outwardly of the ring gear 115 and distributed around the axis AX, as well as second external notches 115b, which are located between the second external teeth 115a and which are also facing outwardly of the ring gear 115 and distributed around the axis AX, as represented in FIGS. 7 and 11. When the ring gear 115 is introduced into the sleeve 15, this meshing takes place by the fact that the second external teeth 115a (or clutches 115a) of the ring gear 115 penetrate into the first internal notches 15b of the sleeve 15 and by the fact that the first internal teeth 15a (or clutches 15a) of the sleeve 15 penetrate into second external notches 115b of the ring gear 115. The rotation of the rotating portion (301, 302) of the welding head 100 secured to the ring gear 115 meshing with the sleeve 15 then drives in rotation around the axis AX the central shaft 14 relative to the side wall 12 of the external body 11 of the accessory 10.

In this way, the work tool 50 fastened to the central shaft 14 is driven in rotation from the welding head 10, in order to thus perform on the parts or on the welding line L, which has been made beforehand by the friction stir welding head 100 between the parts P10 and P20 (welding during step E1 of FIG. 11), a work possibly other than the welding as will be described below with reference to FIGS. 12 to 15. In particular, the work tool 50 can be a machining tool, such as a milling tool, but can also be other. It is thus possible, through the work tool 50 which is driven in rotation from the head 100 via the interface accessory 10, to perfect the welding line L, which has been made beforehand by the friction stir welding tool O, for example by removing collateral asperities DF from the welding line L during step E5, as represented in FIG. 15.

The accessory 10 according to the invention also allows dispensing with removing from the head 100 the friction stir welding tool O (pin OE and shoulder OP of the tool O) which can be left fastened to the head 100 and introduced into the second recess 140 of the central shaft 14 of the interface accessory 10, during steps E3, E4, E5, E6 and E7. This represents a saving of time to perform the processing of the welding line L by the work tool 50 driven in rotation from the head 100.

The second side wall 142 can have transversely to the axis AX a width generally decreasing from the internally toothed coupling sleeve 15 to the second lower portion 141 of the central shaft 14. This allows arranging in the central shaft 14 a second recess 140 also having transversely to the axis AX a width generally decreasing from the internally toothed coupling sleeve 15 to the second lower portion 141. A space is left in the second recess 140 around the rotating portion 301, 302 of the head 100 when the latter is in the meshed position of the external ring gear 115 with the sleeve 15.

According to one embodiment of the invention, the second side wall 142 can comprise internal grooves 143 in the second recess 140 and/or external grooves 144. These internal grooves 143 and/or these external grooves 144 may be transverse to the axis of rotation AX. This allows having a greater cooling or heat dissipation surface in the central shaft 14 and/or outside the central shaft 14, when the rotating portion 301, 302 of the head 100 drives the central shaft 14 in rotation at high speed around the axis AX.

According to one embodiment of the invention, in the second lower portion 141 of the central shaft 14 there is a central lower recess 145 open downwards, in which the work tool 50 or the support 150 of the work tool 50 can be fastened. For this purpose, the work tool 50 (or the support 150 of the work tool 50) inserted from below into the central lower recess 145 can be fastened by a screw 51 (or by other fasteners) screwed into a thread of the second lower portion 141 of the central shaft 14 and clamping the work tool 50 or the support 150 of the work tool 50.

According to one embodiment of the invention, the second lower portion 141 of the central shaft 14 comprises one (or several) air through channel(s) 146 between the second recess 140 internal to the central shaft 14 and an external surface 147 of the second lower portion 141 of this central shaft 14. The air through channel(s) 146 is distinct from the central lower recess 145. The accessory 10 thus allows passing a ventilation air stream through the upper opening 130 via the first recess 120 and the second recess 140 in the central shaft 14 and evacuating by the air through channel 146 outwards the heat released by the rotation of the rotating portion 301, 302 of the head 100. For this purpose, the head 100 can comprise a source of compressed ventilation air, making it possible to supply, for example, through air outlet orifices 346 arranged in the second shaft 302 of the head 100, compressed ventilation air towards the first recess 120 and the second recess 140, when the rotating portion 301, 302 of the head 100 is in the meshed position of the external ring gear 115 with the sleeve 15.

According to one embodiment of the invention, one (or several) bearing(s) 16a, 16b for supporting the rotation of the central shaft 14 around the axis of rotation AX is/are disposed between the central shaft 14 and the first side wall 12. There can be provided for example an upper bearing 16b for supporting the rotation of the central shaft 14 around the axis of rotation AX, for example around the sleeve 15. There can be provided for example a lower bearing 16a for supporting the rotation of the central shaft 14 around the axis of rotation AX, for example a little above the lower portion 141 and further below the upper bearing 16b.

The bearing 16a for supporting the rotation of the central shaft 14 can be a bearing assembly 16 with rolling elements (for example balls or rollers or the like) or with friction elements (for example plain bearing or other). For example, the bearing assembly 16a with rolling elements comprises at least a first bearing guide 161a fastened to the first side wall 12, at least a second bearing guide 162a, which is fastened to the central shaft 14 and which is rotatable relative to the first bearing guide 161a, and first rolling elements 163a disposed between the first bearing guide 161a and the second bearing guide 162a. Lower screws 164a can be used to maintain the first bearing guide 161a fastened from below to the first side wall 12. A lower ring 165a can be screwed around the central shaft 14 under the second bearing guide 162a to fasten this lower ring 165a.

The bearing 16b for supporting the rotation of the central shaft 14 can be a bearing assembly 16b with rolling elements (for example balls or rollers or the like) or with friction elements (for example plain bearing or the like). For example, the bearing assembly 16b with rolling element comprises at least a first bearing guide 161b fastened to the first side wall 12, at least a second bearing guide 162b, which is fastened to the central shaft 14 and which is rotatable relative to the first bearing guide 161*b*, and second rolling elements 163*b* disposed between the first bearing guide 161*b* and the second bearing guide 162*b*. Upper screws 164*b* can be used to maintain the first bearing guide 161*b* fastened from above to the upper portion 121 of the first side wall 12. An upper ring 165*b* can be screwed around the central shaft 14, namely around the sleeve 15, on the second bearing guide 162*b* to fasten this upper ring 165*b*.

Friction Stir Welding Head 100

The friction stir welding head 100 is described below with reference to FIGS. 7, 8A, 8B and 11 to 15.

The friction stir welding head 100 comprises an external frame 300, intended to be fastened from above to a chassis of a machine, not represented. This machine can be a machine tool, for example a numerically-controlled machine tool. The machine comprises a drive spindle, which is rotatably assembled around the axis AX relative to a chassis.

The head 100 comprises a second rotating shaft 302, which protrudes under the external frame 300 and on which a friction stir welding tool O, protruding downwards must be fastened. For that purpose, the tool O is for example fastened to a tool holder 301, itself fastened to the second shaft 302. The tool holder 301 can be integral with the second shaft 302 or distinct from the second shaft 302. The tool O can be integral with the tool holder 301 or distinct from the tool O. The external ring gear 115 can be fastened between the tool holder 301 and the second shaft 301 or be fastened around the second shaft 302 or be fastened around the tool holder 301. The head 100 comprises in the external frame 300 a mechanism 700 for transmitting the rotation of the drive spindle to the second shaft 302 and therefore to the friction stir welding tool O around the axis AX relative to the external frame 300. Reference may be made to document EP-B-3 389 913 as regards the friction stir welding head 100.

The friction stir welding tool O comprises, for example, a central end pin OE, which protrudes downwards and which is fastened, by means of a shoulder OP transverse to the axis AX and higher than the pin OE, to an upper portion fastened to the tool holder 301. For example, the tool holder 301 comprises a central recess 41 for housing the upper end of the upper portion of the tool O, by fastening means, for example by screwing or other. For example, the shaft 302 comprises at its lower end another central recess 42 for housing the upper end of the tool holder 301, by fastening means, for example by screwing or other.

As represented in FIG. 11, the friction stir welding (FSW) is performed by rotating the tool O around the axis AX (along the arrow R), to penetrate the pin OE in the at least two parts P10 and P20 to be welded, until abutting the shoulder OP against these parts P10 and P20, then displacing the tool O according to a prescribed trajectory D along a joint line LJ to make the weld L. Parts P10 and P20 may have been placed edge to edge to make the welding, the tool O totally or partially crossing the parts P10 and P20. Or the part P10 can be placed below the part P20 in order to perform a welding by transparency, the tool O totally or partially crossing the part P10. The rotation of the tool O therefore creates an area Z for stirring the material of the parts P10 and P20. The friction stir welding requires a rotational movement R, a forward movement D and a forging effort F. The parts P10 and P20 to be welded were fastened to a work table 600 beforehand.

In the embodiments described below, an actuatable gripping mechanism (actuatable gripper) comprising a system of actuatable clamps (which may be with balls or with a pivoting helical jack or other) and which may be electric or hydraulic or pneumatic or mechanical or magnetic or other), is provided to fasten and separate the plate 13 of the accessory 10 relative to a second plate 313 of the head 100.

According to one embodiment of the invention, represented in FIGS. 1 to 15, each portion 131 for fastening the work interface accessory 10 comprises a pull tab 1311, which is facing upwards and which is fastened to the plate 13.

According to one embodiment of the invention, represented in FIGS. 1 to 15, the frame 300 of the head 100 comprises a second plate 313 for bearing against the upper plate 13. The second plate 313 carries actuatable clamps 314 facing downwards and allowing gripping and releasing the fastening portions 131. The clamps 314 form a system of clamps of a gripping mechanism.

Of course, in other embodiments not represented, it is the fastening portions 131 of the work interface accessory 10 that could each carry an actuatable clamp 314 making it possible to grip and release other fastening portions, which are fastened to the second plate 313 of the head 100 and which are facing downwards.

According to one embodiment of the invention, the actuatable gripping clamps 314 are actuatable by a pressurized fluid so that the clamps 314 are either in a position P1 of gripping of the fastening portions 131 in FIGS. 8A, 8B, 9, 13, 14 and 15 or of the other fastening portions, or in a released position P2 of releasing of the fastening portions 131 in FIGS. 7, 9, 11 and 12 or of the other fastening portions. The head 100 can comprise a source 3221 that can be controlled to supply or not to supply pressurized fluid to the clamps 314. The pressurized fluid can be for example compressed air, the clamps 314 being pneumatically actuated in this case. Of course, the actuatable gripping clamps 314 could be of another type, such as of the magnetic attraction type, or the like. The actuatable gripping clamps 314 can be controlled quickly and in an automated manner from the welding head 100, by dispensing with an actuator fixed to the work interface accessory 110 or to the fastening portions 131.

Of course, in other embodiments not represented, the actuatable gripping clamps 314 are actuatable by a means other than a pressurized fluid, and this for example electrically or mechanically or hydraulically or magnetically or otherwise, to be either in the position P1 of gripping of the fastening portions 131 or of the other fastening portions, or in the position P2 of releasing of the fastening portions 131 or of the other fastening portions.

According to one embodiment of the invention, the actuatable gripping clamps 314 are configured such that the supply of the pressurized fluid to the clamps 314 causes them to move from the position P1 of gripping of the fastening portions 131 to the position P2 of releasing of the fastening portions 131 and such that the absence of supply of the pressurized fluid to the clamps 314 allows them to move from the position P2 of releasing of the fastening portions 131 to the position P1 of gripping of the fastening portions 131.

According to one embodiment of the invention, represented in FIG. 7, the actuatable gripping clamps 314 each comprise an inlet 322 for supplying the pressurized fluid. The inlets 322 for supplying the pressurized fluid are connected to a share pipe 3320 for supplying the pressurized fluid. The pressurized fluid source 3221 is connected to the shared pipe 3320. The shared pipe 3320 is provided outside the frame 300, above the second plate 313.

According to one embodiment of the invention, represented in FIG. 9, each actuatable gripping clamp 314 is of the type clamping module with balls 315 loaded by a spring 321 against the gripping recess 1312 of the pull tab 1311 in the position P1 of gripping of the fastening portion 131. The actuatable gripping clamp 314 comprises a casing 318 comprising a duct 316 in which second balls 315 are movable and a hole 317 for receiving the pull tab 1311 in the casing 318. The duct 316 communicates with the hole 317. Each actuatable gripping clamp 314 comprises a piston 319 slidably assembled in the casing 318 and a spring 321 compressed between the casing 318 and the piston 319. The piston can be for example vertically slidable. The piston 319 is secured to an external lug 320 located in the duct 316. The external lug 320 can be oblique relative to the direction 323 of the duct 316 going towards the hole 317, so that the displacement of the piston 319 transversely to this direction of the duct 316 is converted into a displacement of the second balls 315. The external lug 320 is configured to push the second balls 315 into the hole 317 under the preload force exerted by the spring 321 on the piston 319 so that the second balls 315 are protruding into the hole 317 and are blocked against the lateral gripping recess 1312 of the pull tab 1311, which represents the position P1 of gripping of the fastening portion 131, when the fastening portion 131 has been introduced into the hole 317. Each actuatable gripping clamp 314 comprises an inlet 322 for supplying the pressurized fluid against the piston 319 oppositely to the spring 321. This pressurized fluid can be for example compressed air. The supply of the pressurized fluid into the inlet 322 moves the piston 319 oppositely to the spring 321 to move the external lug 320 away from the second balls 315, which allows the second balls 315 to move away from the hole 317 and thus move into the position P2 of releasing of the fastening portion 131.

According to another embodiment of the invention, represented in FIG. 16, each actuatable gripping clamp 314 is of the rotary jack type, comprising a casing 331 containing a motor, which is rotatable around an axis AX2 parallel to the axis AX and which is able to drive in rotation a nose 332, which protrudes above and on the side of the casing 331.

In one case, the second plate 313 of the head 100 carries the actuatable clamps 314 of FIG. 16 facing downwards. The actuatable clamps 314 of FIG. 16 allow the noses 332 located in a certain position of rotation to come under the fastening portions of the accessory 10, formed by the edges of the plate 13, to grip it in the position P1 of gripping of the latter. The actuatable clamps 314 of FIG. 16 allow moving the noses 332 apart from the fastening portions of the head 100, formed by the edges of the plate 13, to be in the position of releasing of the accessory 10.

In another case, the fastening portions 131 of the accessory 10 comprise the actuatable clamps 314 of FIG. 16 facing upwards. The actuatable clamps 314 of FIG. 16 allow the noses 332 located in a certain position of rotation to come onto the fastening portions of the head 100, formed by the edges of the second plate 313 of the head 100, to grip it in position P1 of gripping of the latter. The actuatable clamps 314 of FIG. 16 allow moving the noses 332 apart from the fastening portions of the head 100, formed by the edges of the second plate 313 of the head 100, to be in the position of releasing of the head 100.

Cradle 400 for Receiving the Accessory 10

The invention also relates to a cradle 400, which is separate from the work interface accessory 10 and which is used to place thereon the work interface accessory 10 from the welding head 100 in a storage position on the cradle 400, and to pick up therefrom the work interface accessory 10 by the welding head 100. The cradle 400 is described below with reference to FIGS. 7, 12, 13 and 14.

The cradle 400 comprises an upper support 411. The cradle 400 comprises flexible or rigid holding elements 401, 402, 403, 404, for example in the form of feet 401, 402, 403, 404, which are fastened under the upper support 411 to maintain the upper support 411 at a determined height above a lower end 405 of the holding elements 401, 402, 403, 404.

The upper support 411 comprises a second opening 410 wider transversely than the external body 11 of the work interface accessory 10 and narrower transversely than the upper plate 13. The second opening 410 is facing upwards and is crossed by the external body 11 and located between the holding elements 401, 402, 403, 404 in the storage position of the work interface accessory 10 on the upper support 411. The work interface accessory 10 is thus accessible from above so that it can be taken by the welding head 10 in step E4 of FIG. 14. The cradle 400 thus ensures a prescribed and reproducible orientation of the work interface accessory 10 for the welding head 100 in the storage position, that is to say in steps E3, E4 of picking up the accessory 10 by the head 100 in FIGS. 13 and 14 and in the step E7 of reinstalling the accessory 10 on the cradle 400 in FIG. 13.

The upper support 411 can comprise side stops 413 and 414 protruding upwards, remote from each other along the direction Y, for example at two ends of the upper support 411. The upper support 411 is configured to hold by the protruding side stops 413 and 414 the upper plate 13 of the work interface accessory 10. A precise and reproducible positioning of the accessory 10 on the support 411 in the storage position is thus obtained.

The upper plate 13 of the work interface accessory 10 can also comprise a lower surface 133 that is planar, central and for example horizontal, which rises on two side flanges 134 and 135 spaced from each other along the direction Y. The two side flanges 134 and 135 are supported respectively on the two protruding side stops 413 and 414 in the storage position. The support 411 comprises between and under the two protruding side stops 413 and 414 a planar upper surface 412 in which the opening 410 is located. In the storage position, the lower surface 133 of the plate 13 is above the planar upper surface 412. The friction between the plate 13 and the support 411 is thus reduced.

According to one embodiment of the invention, the cradle 400 comprises a lower assembly panel 406, fastened to the lower end 405 of the holding elements 401, 402, 403, 404 and disposed under the opening 410. The lower assembly panel 406 allows fastening (for example by bolting or screwing passing through holes 407 of the panel 406) the cradle 400 to the work table 600. The lower assembly panel 406 can comprise a lower opening 408c allowing the work tool 50 or the support 150 to pass through in the storage position.

The holding elements 401, 402, 403, 404 can be made of an elastomer, such as rubber, for example. This allows absorbing the shocks caused by the head 100.

The cradle 400 and the work interface accessory 10 can form part of a work kit 500.

The friction stir welding head 500 can also form part of the work kit 500.

The work tool 50, the support 150 of the work tool 50 or the machining tool 50 or the milling tool 50 or the work kit 100 can also form part of the work kit 500.

According to one embodiment of the invention represented in FIG. 7, the upper support 411 of the cradle 400 comprises a first sensor 441 for detecting the presence of the upper plate 13 of the work interface accessory 10.

According to one embodiment of the invention represented in FIG. 7, the second plate 313 of the friction stir welding head 100 comprises a second sensor 341 for detecting the presence of the upper plate 13 of the work interface accessory 10, for example to detect a determined portion 341b provided on the upper plate 13 of the work interface accessory 10, this determined portion 341b being facing and in the vicinity of the second sensor 341 in the storage position.

The signals for detecting the presence or absence of the upper plate 13 of the work interface accessory 10, produced by the first sensor 441 and by the second sensor 341 can be supplied to a control unit or to a control automat of the head 100, which can determine at which step among the steps E1 to E8 described below the head 100 is, as a function to the combination of these detection signals.

Method for Welding Parts

The invention also relates to a method for welding the parts P10 and P20 using the work kit 100 described above. This welding method comprises the steps E1 to E8 which are described below with reference to FIGS. 10 to 15.

During a first step E1 in FIG. 11, the parts P10 and P20 fastened on the table 600 are welded along the welding line L using the friction stir welding head 100. The head 100 rotates the protruding pin OE fastened to the lower rotating portion 301, 302 around the axis of rotation AX against the parts P10 and P20. The friction stir welding head 100 and the table 600 are moved relative to each other along the joint line LJ between the parts P10 and P20.

In general, the head 100 can be controlled by a numerically controlled machine to automatically move the head 100 and the table 600 according to a programmed and pre-recorded trajectory relative to each other. For example, the numerically controlled machine is configured to move the head 100 in the axial direction AX and to move the table 600 in the two transverse directions X and Y, transverse to the axial direction AX.

Then, during the second step E2 in FIG. 12, the numerically controlled machine moves the welding head 100 and the table 600 relative to each other to bring the welding head 100 above the first recess 120 of work interface accessory 10. This work interface accessory 10 has, before the second step E2, been disposed in the storage position on the upper support 411 of the cradle 400 having been fastened on the table 600. The work tool 50 or the support of the work tool 150 has, before the second step E2, been fastened under the second lower portion 141 of the central shaft 14 of the work interface accessory 10.

Then, during the third step E3 in FIG. 13, the numerically controlled machine moves the welding head 100 and the table 600 relative to each other to introduce the welding head 100 into the second recess 140 of the central shaft 14 of the work interface accessory 10. The head 100 introduces the externally toothed ring gear 115 of the rotating portion 301, 302 of the welding head 100 into the internally toothed coupling sleeve 15 of the central shaft 14 of the accessory 10 to make the ring gear 115 mesh with the sleeve 15. The numerically controlled machine or an independent automated system actuates the actuatable clamps 314 of the welding head 100 to grip the fastening portions 131 of the accessory 10.

Then, during the fourth step E4 in FIG. 14, the numerically controlled machine moves the welding head 100 and the table 600 relative to each other to move the welding head 100 to lift the work interface accessory 10 above the cradle 400.

Then, during the fifth step E5 in FIG. 15, the numerically controlled machine moves the welding head 100 and the table 600 relative to each other to bring the work tool 50 against the welding line L of the parts P10 and P20 and rotates around the axis of rotation AX the lower rotating portion 301, 302 of the welding head 100. The numerically controlled machine moves the welding head 100 and the table 600 relative to each other to guide the work tool 50 along the welding line L while this work tool 50 rotates around the axis AX. This allows the work tool 50, which is for example a milling tool, to remove the collateral asperities DF from the welding line L or to carry out any other material removal operation.

An operation of storing the work interface accessory 10 on the cradle 400 is described below, with reference to FIGS. 10 and 12 to 15, which can take place after step E5 during the method.

In FIG. 14, during the sixth step E6 subsequent to the fifth step E5, the numerically controlled machine moves the welding head 100 and the table 600 relative to each other to move the work tool 50 away from the welding line L of the parts P10 and P20, brings the work interface accessory 10 above the cradle 400 and stops the rotation of the lower rotating portion 301, 302 of the welding head 100.

Then, during the seventh step E7 in FIG. 13, the numerically controlled machine moves the welding head 100 and the table 600 relative to each other to dispose the work interface accessory 10 on the upper support 411 of the cradle 400.

Then, during an eighth step E8 in FIG. 12, the numerically controlled machine actuates the actuatable clamps 314 of the welding head 100 to release the fastening portions 131 of the work interface accessory 10 which then moves into the storage position on the cradle 400. Then, the numerically controlled machine moves the welding head 100 and the table 600 relative to each other to withdraw the welding head 100 out of the work interface accessory 10.

Of course, the embodiments, characteristics, possibilities and examples described above can be combined with each other or be selected independently of each other.

The invention claimed is:

1. A work kit, comprising a work interface accessory and a friction stir welding head, wherein the work interface accessory, which is intended to be assembled on a friction stir welding head and which is able to be disassembled relative to the friction stir welding head, wherein the work interface accessory comprises an external body having a first side wall delimiting a first recess open on top for introduction of a rotating portion of the friction stir welding head in the first recess and for withdrawal of the friction stir welding head out of the first recess, the work interface accessory comprises an upper plate, which is fastened on an upper portion of the first side wall or which is integral with the upper portion of the first side wall, which has a first upper opening connected to the first recess and which comprises fastening portions, allowing removable fastening against the friction stir welding head, the work interface accessory comprising a central shaft, which is rotatably assembled in the first side wall around an axis of rotation, the central shaft having a second lower portion, which projects from a first lower portion of the first side wall downwards and which is intended to carry a work tool, the central shaft comprising in the first recess an internally toothed coupling sleeve to allow the central shaft to be driven in rotation, when an externally toothed ring gear of the rotating portion of the friction stir welding head is introduced into the internally toothed coupling sleeve and rotates in the internally toothed coupling sleeve around the axis of rotation, wherein the friction stir welding head comprises a frame and the rotating portion, rotatably assembled relative to the frame and protruding therefrom downwards, the frame comprising a second plate for bearing against the upper plate, the second plate comprising a gripping mechanism comprising a system of clamps, which is facing downwards and which is intended to be fastened on the fastening portions of the upper plate of the work interface accessory, or the fastening portions of the upper plate of the work interface accessory comprising a gripping mechanism comprising a system of clamps, which is facing upwards and which is intended to be fastened on other fastening portions of the second plate of the friction stir welding head, wherein the fastening portions of the upper plate of the work interface accessory each comprise a pull tab, which is facing upwards and which is fastened to the upper plate, or the other fastening portions of the second plate of the friction stir welding head each comprise a pull tab, which is facing downwards and which is fastened to the second plate, wherein the clamps are actuatable by a pressurized fluid or electrically or mechanically or hydraulically or magnetically to be either in a position of gripping the fastening portions, or in a position of releasing the fastening portions.

2. The work kit according to claim 1, wherein each fastening portion comprises the gripping mechanism comprising the system of clamps, which is fastened to the upper plate.

3. The work kit according to claim 1, wherein each fastening portion comprises the pull tab to be gripped which is fastened to the upper plate.

4. The work kit according to claim 1, wherein at least one bearing for supporting rotation of the central shaft around the axis of rotation is disposed between the central shaft and the first side wall.

5. The work kit according to claim 4, wherein the at least one bearing for supporting rotation of the central shaft is a bearing assembly, comprising at least a first bearing guide fastened to the first side wall, at least a second bearing guide, which is fastened to the central shaft and which is rotatable relative to the first bearing guide.

6. The work kit according to claim 1, wherein the central shaft comprises a second side wall delimiting a second recess open on top for introduction of the rotating portion of the friction stir welding head, the second recess being comprised in the first recess, the internally toothed coupling sleeve being fastened to the second side wall or being integral with the second side wall and extending the second recess.

7. The work kit according to claim 6, wherein the second side wall has a horizontal width decreasing between the internally toothed coupling sleeve and the second lower portion of the central shaft.

8. The work kit according to claim 6, wherein the second side wall comprises internal grooves and/or external grooves.

9. The work kit according to claim 8, wherein the internal grooves and/or the external grooves are transverse to the axis of rotation.

10. The work kit according to claim 1, wherein the second lower portion of the central shaft comprises a central lower recess, in which the work tool or a support of the work tool is intended to be fastened.

11. The work kit according to claim 10, wherein the second lower portion of the central shaft comprises, in addition to the central lower recess, at least one through channel between the second recess and an external surface of the second lower portion.

12. The work kit according to claim 1, further comprising a cradle, separate from the work interface accessory, the cradle comprising an upper support and support elements fastened under the upper support to maintain the upper support at a determined height above a lower end of the support elements, the upper support being able to hold the upper plate of the work interface accessory, the upper support comprising a second opening facing upwards for the external body of the work interface accessory to pass through the second opening between the support elements, when the work interface accessory is disposed in a storage position on the upper support.

13. The work kit according to claim 12, wherein the cradle comprises a lower assembly panel, fastened to the lower end of the support elements.

14. The work kit according to claim 1, wherein the second plate of the friction stir welding head comprises a second sensor for detecting a presence of the upper plate of the work interface accessory.

15. The work kit according to claim 12, wherein the upper support comprises a first sensor for detecting a presence of the upper plate of the work interface accessory.

16. The work kit according to claim 1, wherein the work kit further comprises as a work tool a machining tool or a milling tool.

17. A Method for welding parts using the work kit according to claim 12, comprising during a first step, welding the parts fastened on a table according to a welding trajectory using the friction stir welding head, one pin of which fastened to the rotating portion is rotated around the axis of rotation against the parts, moving the friction stir welding head and the table relative to each other according to the welding trajectory, to make a welding line, during a second step subsequent to the first step, moving the friction stir welding head and the table relative to each other to bring the friction stir welding head above the first recess of the work interface accessory, having been disposed on the upper support of the cradle having been fastened on the table, a work tool or support of the work tool having been fastened under the second lower portion of the central shaft of the work interface accessory, during a third step subsequent to the second step, moving the friction stir welding head and the table relative to each other to introduce the friction stir welding head into a second recess of the central shaft of the work interface accessory, so as to mesh the externally toothed ring gear of the rotating portion of the friction stir welding head with the internally toothed coupling sleeve of the central shaft of the work interface accessory, and actuating the clamps of the friction stir welding head to grip the fastening portions of the work interface accessory, during a fourth step subsequent to the third step, moving the friction stir welding head and the table relative to each other to lift with the friction stir welding head the work interface accessory above the cradle, during a fifth step subsequent to the fourth step, moving the friction stir welding head and the table relative to each other to bring the work tool against the welding line of the parts by rotating around the axis of rotation the rotating portion of the friction stir welding head, moving the friction stir welding head and the table relative to each other according to the welding trajectory.

18. The method for welding parts according to claim 17, wherein during a sixth step subsequent to the fifth step, moving the friction stir welding head and the table relative to each other to move the work tool away from the welding line of the parts and bring the work interface accessory above the cradle, stopping the rotation of the rotating portion of the friction stir welding head, during a seventh step subsequent to the sixth step, moving the friction stir welding head and the table relative to each other to dispose the work interface accessory on the upper support of the cradle, during an eighth step subsequent to the seventh step, actuating the clamps of the friction stir welding head to release the fastening portions of the work interface accessory, then moving the friction stir welding head and the table relative to each other to withdraw the friction stir welding head out of the work interface accessory.

* * * * *